(12) United States Patent
Sane

(10) Patent No.: US 11,359,540 B2
(45) Date of Patent: *Jun. 14, 2022

(54) MULTILOOP GAS TURBINE, SYSTEM, AND METHOD OF OPERATION THEREOF

(71) Applicant: NOSTRUM ENERGY PTE. LTD., Singapore (SG)

(72) Inventor: Shrikrishna Kashinath Sane, Maharashtra (IN)

(73) Assignee: Nostrum Energy PTE. LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 17/161,565

(22) Filed: Jan. 28, 2021

(65) Prior Publication Data
US 2021/0148281 A1 May 20, 2021

Related U.S. Application Data

(63) Continuation of application No. 15/567,197, filed as application No. PCT/IN2016/050111 on Apr. 16, 2016, now Pat. No. 10,947,897.

(Continued)

(30) Foreign Application Priority Data

Apr. 17, 2015 (IN) .......................... 1595/MUM/2015

(51) Int. Cl.
*F02C 1/00* (2006.01)
*F02C 3/34* (2006.01)
(Continued)

(52) U.S. Cl.
CPC ............... *F02C 1/007* (2013.01); *F02C 3/34* (2013.01); *F02C 6/00* (2013.01); *F02C 7/08* (2013.01);
(Continued)

(58) Field of Classification Search
CPC ........................................................ F02C 3/34
See application file for complete search history.

(56) References Cited

U.S. PATENT DOCUMENTS

RE30,630 E      6/1981 Morse
5,347,806 A  *  9/1994 Nakhamkin ............ F02C 6/003
                                                          60/792
(Continued)

FOREIGN PATENT DOCUMENTS

CN      104266454 A      1/2015
EP        0329155 A1      8/1989

OTHER PUBLICATIONS

Horlock, J. H., "Advanced Gas Turbine Cycles," Pergamon, Elsevier Science Ltd., Amsterdam, 2003. (Year: 2003).*
(Continued)

*Primary Examiner* — Todd E Manahan
*Assistant Examiner* — David P. Olynick
(74) *Attorney, Agent, or Firm* — Greenberg Traurig, LLP; Jonathan D. Ball; Tanzina Chowdhury

(57) ABSTRACT

The present disclosure relates to a novel gas turbine system having applications, for example, in thermal power generation in an environmentally friendly manner. The multiloop gas turbine system may have multiple functional units each comprising a compressor, a regenerator, a combustion unit, and a turbine. Typically, exhaust flow of a turbine of a preceding loop may be routed to the combustion unit of the next loop, allowing mixing of exhaust flow with hot compressed air of the next loop, and the expanded exhaust from the turbine of the ultimate loop is fed back into the regenerators of each loop to recover exhaust heat.

8 Claims, 22 Drawing Sheets

Related U.S. Application Data

(60) Provisional application No. 62/248,707, filed on Oct. 30, 2015.

(51) Int. Cl.
   *F02C 6/00* (2006.01)
   *F02C 7/143* (2006.01)
   *F02C 7/08* (2006.01)

(52) U.S. Cl.
   CPC ............ *F02C 7/1435* (2013.01); *F02C 6/003* (2013.01); *F05D 2240/40* (2013.01); *Y02E 10/30* (2013.01); *Y02E 10/46* (2013.01)

(56) References Cited

U.S. PATENT DOCUMENTS

| | | | |
|---|---|---|---|
| 6,158,207 | A | 12/2000 | Polenick |
| 6,968,698 | B2 | 11/2005 | Walsh |
| 7,721,523 | B2 | 5/2010 | Tangirala |
| 9,976,448 | B2 | 5/2018 | Peter |
| 2004/0112037 | A1 | 6/2004 | Yagi |
| 2007/0137211 | A1 | 6/2007 | Callas |
| 2009/0064654 | A1 | 3/2009 | Kirzhner |
| 2009/0158739 | A1 | 6/2009 | Messmer |
| 2011/0185701 | A1* | 8/2011 | Koda .................. F02C 3/34 |
| | | | 60/39.182 |
| 2012/0000204 | A1 | 1/2012 | Kessell |
| 2013/0192198 | A1 | 8/2013 | Brilliant |
| 2013/0295887 | A1 | 11/2013 | Treece |
| 2013/0298557 | A1* | 11/2013 | Treece ................ F24S 10/80 |
| | | | 60/641.15 |
| 2016/0298500 | A1 | 10/2016 | Peter |
| 2018/0106192 | A1 | 4/2018 | Sane |

OTHER PUBLICATIONS

Medina, A., Sanchez-Orgaz, S., Calvo Hernandez, A., Solar-Driven Gas Turbine Power Plants, Renewable Energy and Power Quality Journal, No. 11., 2103 (Year: 2013).*

Staffell, I., "The Energy and Fuel Data Sheet," University of Birmingham, UK, 2011. (Year: 2011).*

"SOLGATE: Solar Hybrid Gas Turbine Electric Power System", European Commission Report, EUR 21615, 2005. (Year: 2005).*

Muto, Y., Ishizuka, T., Aritomi, M., Watanabe, N.,, "Comparison of Supercritical CO2 Gas Turbine Cycle and Brayton CO2 Gas Turbine Cycle for Solar Thermal Power Plants", The 4th International Symposium—Supercritical CO2 Power Cycles, September 9-10, Pittsburgh, Pennsylvania, US, 2014. (Year: 2014).*

Sane, S. K., "Novel Multiloop Gas Turbine and Method of Operation thereof", Provisional Indian Patent Application No. 1595/MUM/ 2015, dated Apr. 17, 2015. (Year: 2015).*

Gas Turbine Engineering Handbook (4th Ed), Meherwan P. Boyce, Elsevier, Butterworth-Heinemann, 2012. (Year: 2012).*

Industrial Gas Turbines, Performance and Operability includes CD-ROM by Gas Path Analysis Ltd,, Amy Razak, in North America ORC Press, Woodhead Publishing Ltd, Cambridge England, 2007. (Year: 2007).*

International Search Report dated Sep. 14, 2016 issued in PCT/ IN2016/050111.

* cited by examiner

MULTILOOP GAS TURBINE, SYSTEM, AND METHOD OF OPERATION THEREOF

The present application is a continuation application of U.S. application Ser. No. 15/567,197, filed Oct. 17, 2021, which is a National Stage Application under 35 U.S.C. § 371 of Int'l App. No. PCT/IN2016/050111, filed Apr. 16, 2016, which claims the benefit of and priority to U.S. App. No. 62/842,707, filed Oct. 30, 2015 and IN App No 1595/MUM/2015, filed Apr. 17, 2015, each of which are hereby incorporated by reference in their entirety.

FIELD OF THE DISCLOSURE

Gas turbine technology development in the past fifty years has typically been driven by advanced technologies, such as high performance compressors, turbine blade cooling and materials, lean burning combustors, digital control and the Combined Cycle. The technology development in the next fifty years will likely need a different set of drivers to address the changing global requirements, such as least specific $CO_2$ efflux, ability to work efficiently with renewable thermal energy (e.g., solar), adaptive designs for distributed generation/consumption patterns, minimisation or elimination of use of water and acceptability through affordability to the global emerging markets.

There is no gas turbine cycle concept in the prior art which addresses all of these needs. Various embodiments of the novel gas turbine cycle concepts disclosed herein can address most, if not all, of the above stated requirements. Various embodiments of the novel cycles described herein are capable of operating with thermal efficiency closest to the Carnot limit for all practically feasible range of pressure ratios and combustor exit temperatures. Embodiments of the novel cycles described herein offer far greater possibilities of cycle optimization for the gas turbine technology of future generations.

BACKGROUND OF THE DISCLOSURE

The middle of the 19th Century is associated with great names, such as, Carnot, Rankine, Brayton (Joule) and Ericsson (Stirling) to pave the way for the Gas Turbine Engine to be developed. The objective of simultaneously achieving high specific power and high thermal efficiency was, however, not satisfied by the basic Brayton scheme. Several add-ons, such as regeneration (recuperation), reheating and isothermal (rather than adiabatic) compression/expansion were proposed. There were practical limitations too. Compression (Cycle) Pressure Ratio ($\pi$) was aero-mechanically limited and Maximum Gas Temperature or Cycle Temperature Ratio ($\theta$) was limited by available expensive high temperature materials and cooling technology. The simple open cycle gas turbine operates between ambient pressure boundaries and invariably results in large exhaust heat loss. The combined cycle addressed this by coupling a bottoming Rankine cycle but added complexities and needed water.

In the second half of 20th century, the gas turbine development was less concerned with environmental degradation and primarily only economic factors led to large combined cycle plants with high Gas Temperatures (1900 K), moderately high Pressure Ratios(20-30), high fuel-wire efficiencies (≥60%) and Coal gasification strategies. The roadmap for next fifty years must consider reduction in net gCO2/kWh, smaller units for distributed generation/consumption, use of low temperature renewable heat sources and affordability. Availability and use of water is also going to be critical in future so also we cannot wish away the vast cheap coal reserves.

There is no Gas Turbine Cycle configuration in the prior art [Horlock, Medina], which meets the following requirements in a practically feasible manner: Cycle Efficiency very close to fundamental Carnot limit, to ensure best fuel economy and least CO2 efflux; Maximum possible specific power to ensure smallest possible plant footprint and Capital Cost; No bottoming steam Rankine cycle for simpler plant layout; No new technology development (compressor and turbine) to be cost competitive; Component Commonality to reduce Part Type Count to enhance affordability, Ability to work with locally available fuel (Coal or Natural Gas) or renewable energy (Concentrated Solar Thermal) and No net water consumption.

FIG. 1 illustrates the component icons used in various figures. There are various parameters that are used in defining the cycles, the ambient conditions ($P_0$, $T_0$), Air Mass Flow w and properties (R, $C_p$, $\gamma$). The definitions of these variables are found in Appendix A attached hereto. In addition, two more parameters $\theta$ and $\pi$ need to be defined. $\theta$ is the cycle temperature ratio ($T_{max}$,$T_{min}$) and $\pi$ is the cycle pressure ratio ($P_{max}/P_{min}$). The cycle pressure ratio $\pi$ is the overall compression pressure ratio and hence the isentropic compression temperature ratio $\tau$ is equal to $\pi^{\gamma-1/\gamma}$, where $\gamma$ is ratio of specific heats $C_p/C_v$. For analytical derivations '$\tau$' is a more convenient variable than '$\pi$', even for "Isothermal" processes for which, when $\tau_{T=const.}=1$, as [R Ln($\pi$)=CpLn ($\tau$)].

The simple open cycle gas turbine operates on the Brayton (BRO) cycle and comprises, in series, three components. As depicted in FIG. 2, these three components are the compressor 201, the combustor 203 and the turbine 205. Also depicted in FIG. 1 is a fuel 207.

As depicted in FIG. 3, the closed Ericsson cycle (ERC) comprises Isothermal compression with external cooling 301, Isothermal expansion with external heating 303 and a perfect regenerator 305.

The Regenerative open cycle gas turbine (RGO) comprises, in series, four components. As depicted in FIG. 4, these four components are compressor 401, regenerator 403, combustor 405 and turbine 407. Also depicted in FIG. 4 is a fuel 409. The theory of operation of the regenerative open cycle gas turbine is valid when $\tau<\sqrt{\theta}$.

However, in a simple open cycle gas turbine, the exhaust is expelled in the air through an exhaust pipe, which is in totality wasted. Thus, high specific power and high thermal efficiency is not simultaneously achieved in the Brayton cycle. There were practical limitations too. Cycle pressure ratio ($\pi$) was aero-mechanically limited and maximum gas temperature or cycle temperature ratio ($\theta$) was limited by available expensive high temperature materials and cooling technology. The simple open cycle gas turbine operates between ambient pressure boundaries and invariably results in large exhaust heat loss. The combined cycle addressed this by coupling a bottoming Rankine cycle but added complexities and needed water as an additional working medium for the said bottoming Rankine cycle, where the entire latent heat in the exhaust steam has to be rejected to atmosphere by using, for example, large condensers, large cooling water bodies (such as lakes and rivers) and large cooling towers.

In a combined cycle technique, the heat in the exhaust gas of the gas turbine is fed into a heat recovery steam generator to generate the steam. This steam is in turn used to drive the steam turbine. This overall increases the efficiency of the thermal power plant and also reduces harmful emission in the environment. As stated above, the combined cycle increases complexity.

Appendix B provides an analytical basis for the aforementioned three cycles with respect to relative specific cycle power ID (in non-dimensional form or referred to $wC_pT_o$) and the cycle thermal efficiency $\eta$. Appendix B also discusses Sensitivity of $CO_2$ Efflux.

As seen, for example, from Appendix B, the Ericsson Cycle provides for both high specific power and efficiency equal to the Carnot limit. Two out of three governing processes (Isothermal compression and perfect regeneration) can and are required to be carried forward. Isothermal expansion, however, cannot be considered as such and must be substituted by staged expansion with Reheating.

Further, in order for Regeneration to remain a valid option for all pressure ratios ($\tau \geq \sqrt{\theta}$), it must be coupled with Isothermal or Quasi-Isothermal compression.

Further still, the staged expansion should be networked with staged compression, regeneration and exhaust recompression for the closed cycle configuration.

Thus, the Ericsson cycle, which was a great step forward to bring Carnot's principles into the realm of practical reality for a non-condensing gaseous medium, is the baseline model; one can only aim to approach its thermal efficiency and specific power.

Moreover, the following is noted: (a) The specific $CO_2$ Efflux will be reduced to the extent the thermal efficiency improves. Coal based plants typically need to operate at 67% higher thermal efficiency to be environmentally competitive with Gas based plants; (b) Recapture of water generated, while burning Natural Gas, may be important in specific cases; (c) Small plants operating on renewable thermal energy, such as concentrated solar thermal, would operate with moderate/low maximum temperatures and pressure ratios to be affordable; and (d) Doing away with bottoming Rankine cycle is required where water is scarce or not available at all.

The various disclosed embodiments described below address the problems raised hereinabove and provide solutions thereto.

SUMMARY OF THE DISCLOSURE

Disclosed herein is a novel multiloop gas turbine which is capable of operating with thermal efficiency closest to Ericsson/Carnot limit for all practically feasible range of pressure ratios and combustor exit temperatures.

In one embodiment, a power generation system is provided, comprising: a first compressor and a second compressor; a first regenerator and a second regenerator; a first combustion unit and a second combustion unit; and a first turbine and a second turbine; the first compressor being in operative communication with the first regenerator to provide to the first regenerator compressed gas from the first compressor; the first regenerator being in operative communication with the first combustion unit to provide to the first combustion unit heated gas from the first regenerator; the first combustion unit being in operative communication with the first turbine to provide to the first turbine exhaust gas from the first combustion unit; the second compressor being in operative communication with the second regenerator to provide to the second regenerator compressed gas from the second compressor; the second regenerator being in operative communication with the second combustion unit to provide to the second combustion unit heated gas from the second regenerator; the second combustion unit being in operative communication with the second turbine to provide to the second turbine exhaust gas from the second combustion unit; the first turbine being in operative communication with the second combustion unit to provide to the second combustion unit expanded gas from the first turbine; and the second turbine being in operative communication with the first regenerator and the second regenerator to provide to the first regenerator and the second regenerator expanded gas from the second turbine.

In another embodiment, a power generation system is provided, comprising: a first compressor, a second compressor and a third compressor; a first regenerator, a second regenerator and a third regenerator; a first combustion unit, a second combustion unit and a third combustion unit; and a first turbine, a second turbine and a third turbine; the first compressor being in operative communication with the first regenerator to provide to the first regenerator compressed gas from the first compressor; the first regenerator being in operative communication with the first combustion unit to provide to the first combustion unit heated gas from the first regenerator; the first combustion unit being in operative communication with the first turbine to provide to the first turbine exhaust gas from the first combustion unit; the second compressor being in operative communication with the second regenerator to provide to the second regenerator compressed gas from the second compressor; the second regenerator being in operative communication with the second combustion unit to provide to the second combustion unit heated gas from the second regenerator; the second combustion unit being in operative communication with the second turbine to provide to the second turbine exhaust gas from the second combustion unit; the third compressor being in operative communication with the third regenerator to provide to the third regenerator compressed gas from the third compressor; the third regenerator being in operative communication with the third combustion unit to provide to the third combustion unit heated gas from the third regenerator; the third combustion unit being in operative communication with the third turbine to provide to the third turbine exhaust gas from the third combustion unit; the first turbine being in operative communication with the second combustion unit to provide to the second combustion unit expanded gas from the first turbine; the second turbine being in operative communication with the third combustion unit to provide to the third combustion unit expanded gas from the second turbine; and the third turbine being in operative communication with the first regenerator, the second regenerator and the third regenerator to provide to the first regenerator, the second regenerator and the third regenerator expanded gas from the third turbine.

In another embodiment, a power generation system is provided, comprising: a plurality of functional units, the number of the plurality of functional units being equal to n, and n being an integer greater than 1; each of the plurality of functional units comprising: a compressor, a regenerator, a combustion unit and a turbine; the compressor being in operative communication with the regenerator to provide to the regenerator compressed gas from the compressor; the regenerator being in operative communication with the combustion unit to provide to the combustion unit heated gas from the regenerator; the combustion unit being in operative communication with the turbine to provide to the turbine exhaust gas from the combustion unit; wherein, for each of the functional units other than the nth functional unit, the turbine is in operative communication with the combustion unit of a successive functional unit to provide to the combustion unit of the successive functional unit expanded gas from the turbine; and wherein, for the nth functional unit, the turbine is in operative communication with the regenerator of each preceding functional unit to provide to the regenerator of each preceding functional unit expanded gas from the turbine.

In another embodiment, a power generation method is provided, comprising: directing compressed gas from a first compressor to a first regenerator; directing heated gas from the first regenerator to a first combustion unit; directing exhaust gas from the first combustion unit to a first turbine; directing compressed gas from a second compressor to a second regenerator; directing heated gas from the second regenerator to a second combustion unit; directing exhaust gas from the second combustion unit to a second turbine; directing expanded gas from the first turbine to the second combustion unit; and directing expanded gas from the second turbine to the first regenerator and the second regenerator.

In another embodiment, a power generation method is provided, comprising: directing compressed gas from a first compressor to a first regenerator; directing heated gas from the first regenerator to a first combustion unit; directing exhaust gas from the first combustion unit to a first turbine; directing compressed gas from a second compressor to a second regenerator; directing heated gas from the second regenerator to a second combustion unit; directing exhaust gas from the second combustion unit to a second turbine; directing compressed gas from a third compressor to a third regenerator; directing heated gas from the third regenerator to a third combustion unit; directing exhaust gas from the third combustion unit to a third turbine; directing expanded gas from the first turbine to the second combustion unit; directing expanded gas from the second turbine to the third combustion unit; and directing expanded gas from the third turbine to the first regenerator, the second regenerator and the third regenerator.

In another embodiment, a power generation method is provided, comprising: providing a plurality of functional units, wherein each of the plurality of functional units comprises a compressor, a regenerator, a combustion unit and a turbine, wherein the number of the plurality of functional units is equal to n, and wherein n is an integer greater than 1; directing, for each of the functional units, compressed gas from the compressor to the regenerator; directing, for each of the functional units, heated gas from the regenerator to the combustion unit; directing, for each of the functional units, exhaust gas from the combustion unit to the turbine; directing, for each of the functional units other than the nth functional unit, expanded gas from the turbine to the combustion unit of a successive functional unit to provide to the combustion unit of the successive functional unit expanded gas from the turbine; and directing, for the nth functional unit, expanded gas from the turbine to the regenerator of each preceding functional unit to provide to the regenerator of each preceding functional unit expanded gas from the turbine.

BRIEF DESCRIPTION OF THE DRAWINGS

These and other features, aspects, and advantages of the present invention will become better understood with regard to the following description, appended claims, and accompanying drawings (some of the drawings may be not drawn to scale and some of the drawings may be drawn at the indicated scale; further, where scale and/or dimensions are provided, they are provided as examples only) wherein:

APPENDIX LISTING

Figure 1:
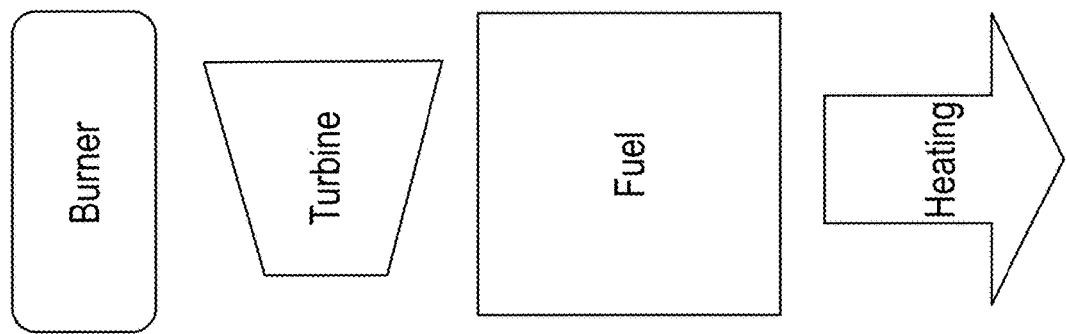
FIG. 1 illustrates various component icons used in the figures.
Figure 1:
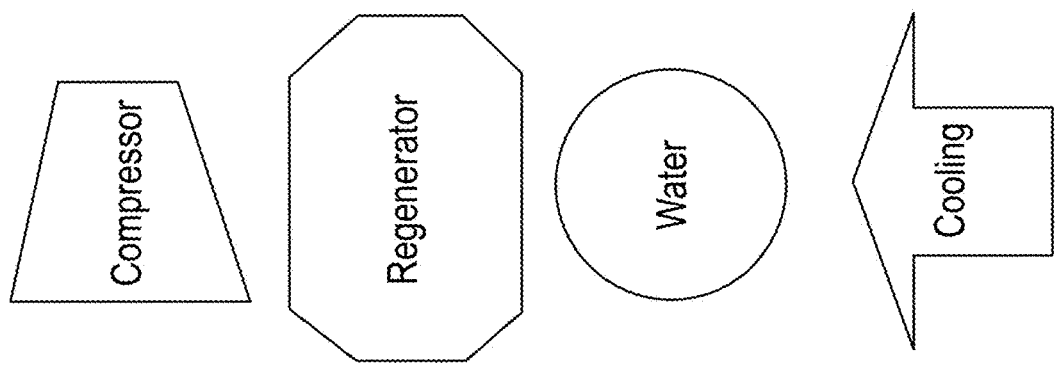

Appendix A identifies various nomenclature used herein.

Appendix B provides an analytical basis for various cycles described herein. Appendix B also discusses Sensitivity of $CO_2$ Efflux.

Appendix C provides a discussion of performance of various Novel Cycles according to embodiments of the disclosure. Appendix C also discusses results of limited simulation and principles of component commonality according to various embodiments of the disclosure.

Appendix D provides a detailed derivation of equations used herein.

Appendix E identifies various references mentioned herein.

Appendix F discusses some additional historical perspective.

DETAILED DESCRIPTION OF THE DISCLOSURE

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions,
structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

For the purpose of describing and claiming the present invention, the term "regenerator" is intended to refer to a type of heat exchanger (for example, a parallel-flow heat exchanger, a counter-flow heat exchanger, or a cross-flow heat exchanger). In one specific example, a regenerator may be an air-to-gas heat exchanger (wherein, for example, air leaving a compressor is heated by gas leaving a turbine such that there is minimal mixing of the air and gas).

For the purpose of describing and claiming the present invention, the term "internal combustion unit" is intended to refer to a combustion unit (such as a burner) which is internal relative to a gas flow path (e.g. a gas flow path of a gas turbine engine system comprising: inlet-compressor-combustion unit-turbine-exhaust, all connected in series in an open cycle configuration).

For the purpose of describing and claiming the present invention, the term "external combustion unit" is intended to refer to a combustion unit (such as a burner) which is external relative to a gas flow path (e.g. a gas flow path of a gas turbine engine system comprising: inlet-compressor-combustion unit-turbine-exhaust, all connected in series in an open cycle configuration).

For the purpose of describing and claiming the present invention, the term "burner" is intended to refer to either: (a) an "internal combustion chamber," such as associated with all
open cycle configurations; or (b) to an "external combustion chamber," such as used as an "external heater" and such as associated with all closed cycle configurations.

Embodiments described below are sometimes referred to as Novel Closed (NCn) and Novel Open (NOn) Cycle schemes, where n is the number of Compression/Expansion Stages, n=1, 2, 3, . . . . In one specific example, n is equal to 2. In another specific example, n is equal to 3. In another specific example, n is equal to 4.

The embodiments described herein are applicable to gas turbine engines in general, such as Aero, Stationary, Locomotive, Marine. It is possible to use any gas turbine software modeling tool known in the art.

Referring now to FIGS. 5-10, various Novel Open and Novel Closed cycle schemes are illustrated for n=1, 2 and 3 compression/expansion stages with Isothermal compression, regeneration and reheating. These differ from conventional reheat scheme which works in series and will have restriction from the depleting Air to Fuel ratio for open cycle. Besides, there is a possibility of increasing specific power substantially by adding a compressor in the loop. Cooled exhaust recompression is, in one example, used for the closed cycle, although valid for open cycle.

For simplicity only, the various Novel Cycle concepts are illustrated under ideal conditions of perfect processes and constant properties. Complete derivation of the performance expressions is provided in the Appendix C.

Figure 4:
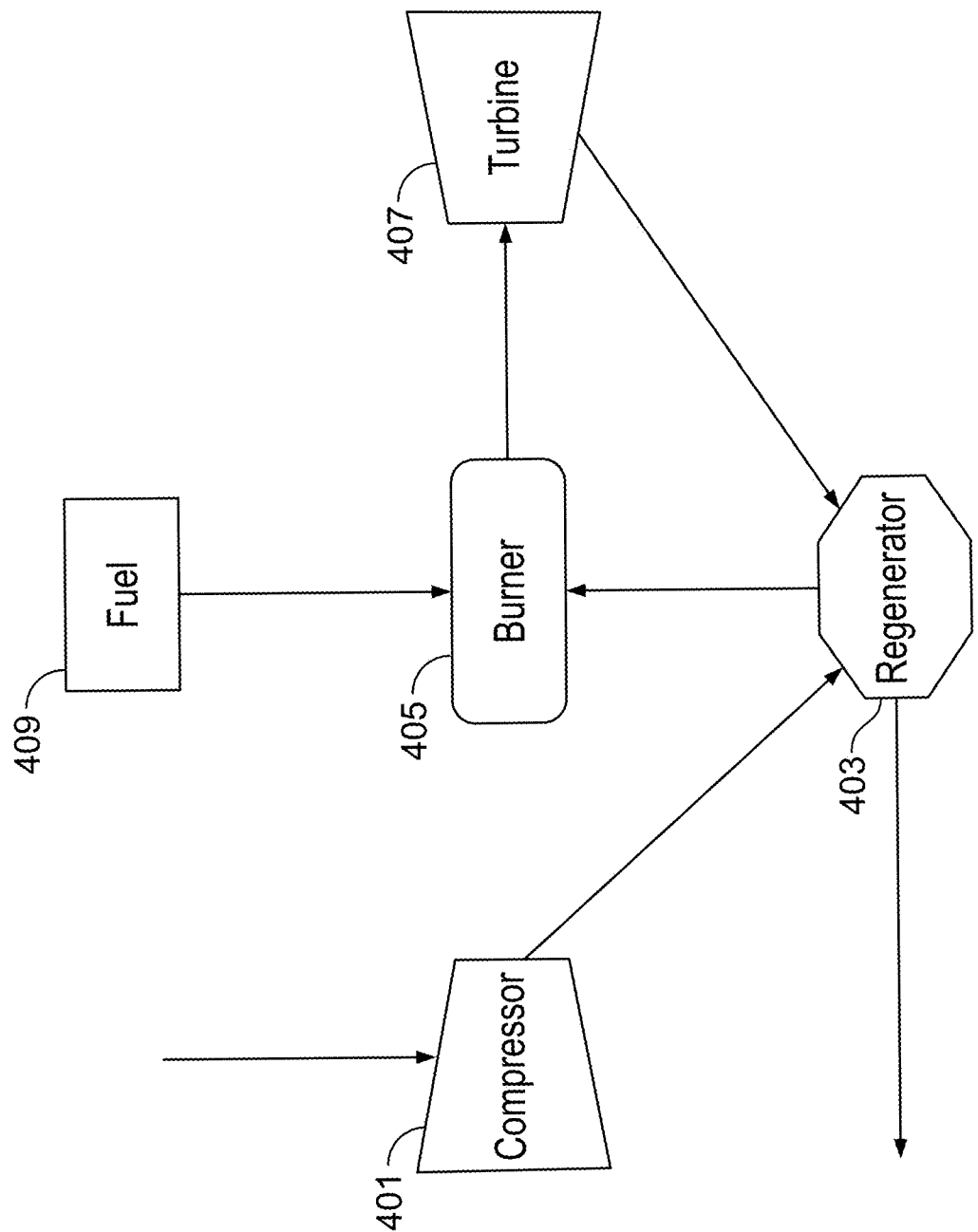
FIG. 4 illustrates the Regenerative Open Cycle (Prior Art).
Figure 5:
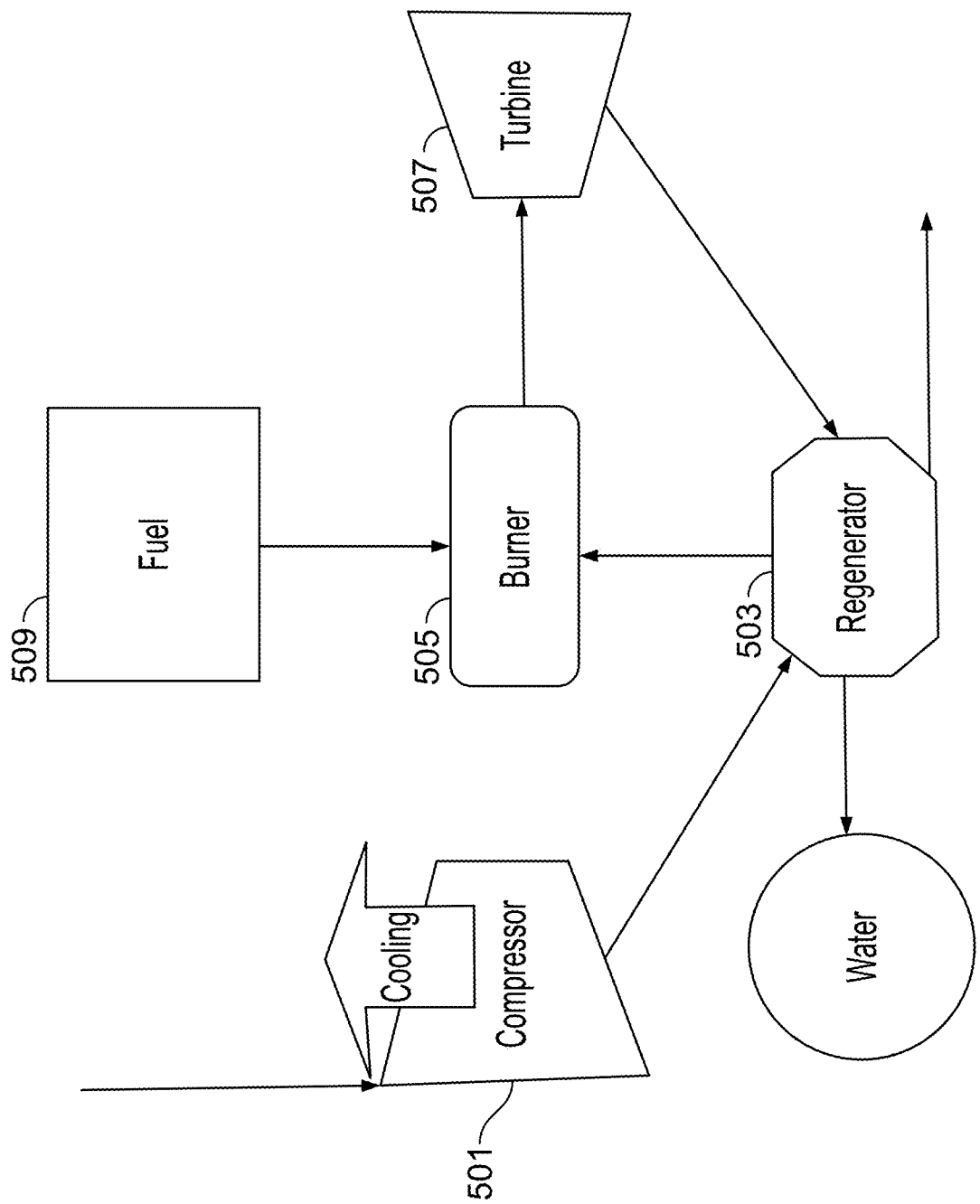
FIG. 5 illustrates a Novel Open Cycle scheme according to an embodiment of the disclosure.

As depicted in FIG. 5, the baseline Novel Open Cycle (n=1) utilizes compressor 501, regenerator 503, combustor 505 and turbine 507. Also depicted in FIG. 5 is a fuel 509. The baseline Novel Open Cycle (n=1) is similar to Open Regenerative Cycle (RGO) of FIG. 4, except with respect to compression, which is ideally isothermal instead of adiabatic. An additional feature added is the use of water for internal cooling of compression to the extent possible (for example, under hot ambient and up to saturation) and water recapture from the regenerator exhaust gases. In the process 1 kg of Methane generates 2.25 kg of water.

Figure 6:
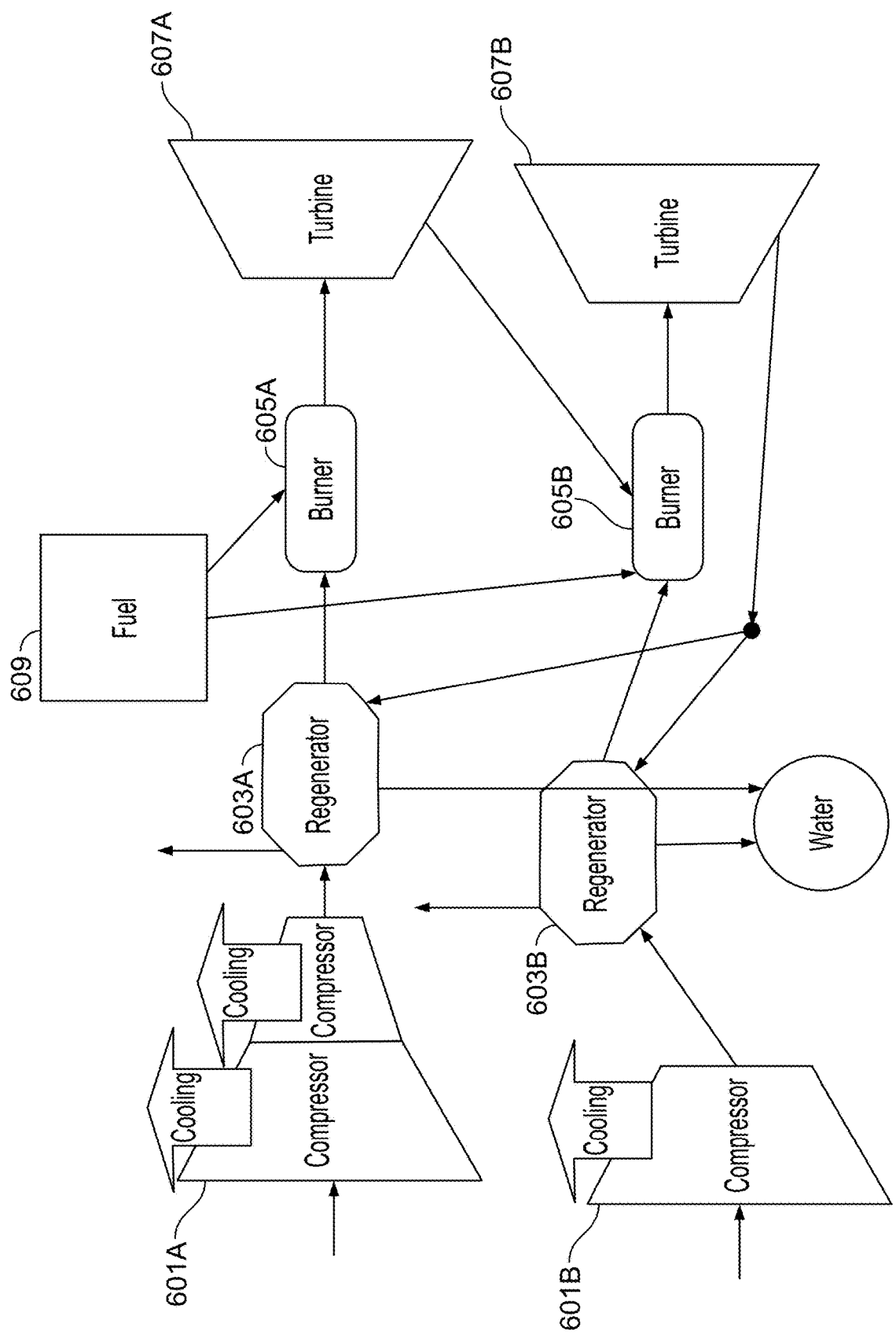
FIG. 6 illustrates a Novel Open Cycle scheme according to an embodiment of the disclosure.

Referring now to FIG. 6, the illustrated two stage Novel Open Cycle (n=2) utilizes compressors 601A and 601B, regenerators 603A and 603B, combustors 605A and 605B, and turbines 607A and 607B. Also depicted in FIG. 6 is a fuel 609. Further, with respect to the two stage Novel Open Cycle (n=2) of FIG. 6, the pressure ratio of each expansion stage is $\pi^{1/2}$. The two compression stages have pressure ratios of $\pi$ and $\pi^{1/2}$ respectively. The exhaust of the first turbine 607A is routed to the burner 605B of the second stage where it mixes with the fresh air from the second compressor 601B after regenerative heating by regenerator 603B. The exhaust from the second turbine 607B is split in two equal parts and routed to the two regenerators 603A, 603B and further to stack. Compressors 601A, 601B are internally cooled by spraying water.
Water is recaptured from both the regenerator exhaust flows. The air to fuel ratio in the second burner 605 needs to be within limits of stable and complete combustion. Further, each compressor may be single stage or multi-stage (in the example shown in this FIG. 6, compressor 601A is at least two stages and compressor 601B is at least a single stage).

Figure 7:
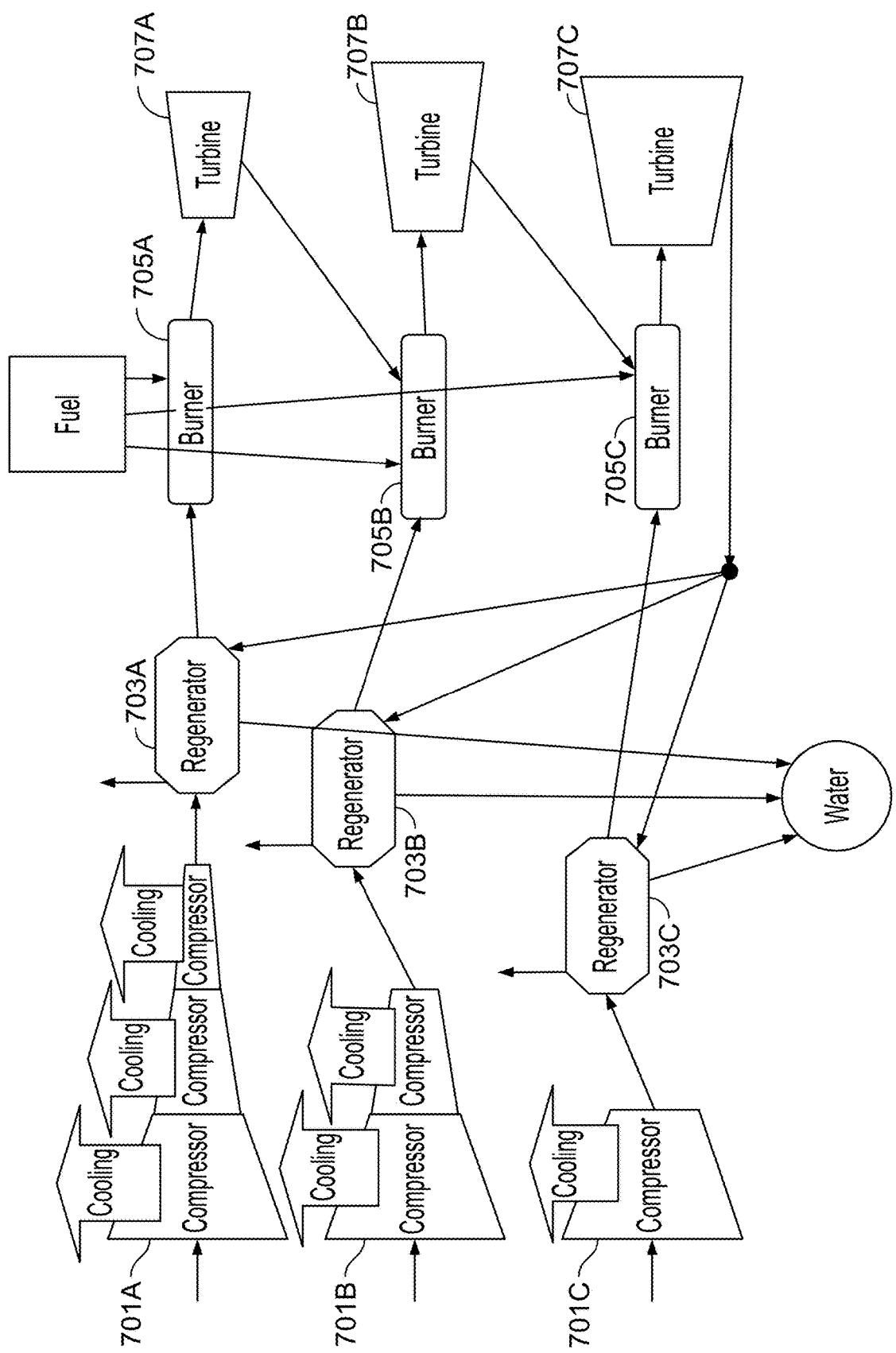
FIG. 7 illustrates a Novel Open Cycle scheme according to an embodiment of the disclosure.

Referring now to FIG. 7, the illustrated three stage Novel Open Cycle (n=3) utilizes compressors 701A, 701B and 701C, regenerators 703A, 703B and 703C, combustors 705A, 705B and 705C, and turbines 707A, 707B and 707C. Also depicted in FIG. 7 is a fuel 709. Further, with respect to the three stage Novel Open Cycle (n=3) of FIG. 7, the pressure ratio of each expansion stage is $\pi^{1/3}$. The three compressions stages have pressure ratios of $\pi$, $\pi^{2/3}$ and $\pi^{1/3}$ respectively. The exhaust of the first turbine 707A is routed to the burner 705B of the second stage where it mixes with the fresh air from the second compressor 701B after regenerative heating by regenerator 703B. The exhaust of the second turbine 707B is routed to the burner 705C of the third stage where it mixes with the fresh air from the third compressor 701C after regenerative heating by regenerator 703C. The exhaust from the third turbine 707C is split in three equal parts and routed to the three regenerators 703A, 703B, 703D and further to stack. The remaining operation is similar to the above and hence not repeated. The air to fuel ratio in the second and third burners 705B, 705C needs to be within limits of stable and complete combustion. Further, each compressor may be single stage or multi-stage (in the example shown in this FIG. 7, compressor 701A is at least three stages, compressor 701B is at least two stages and compressor 701C is single stage).

Figure 3:
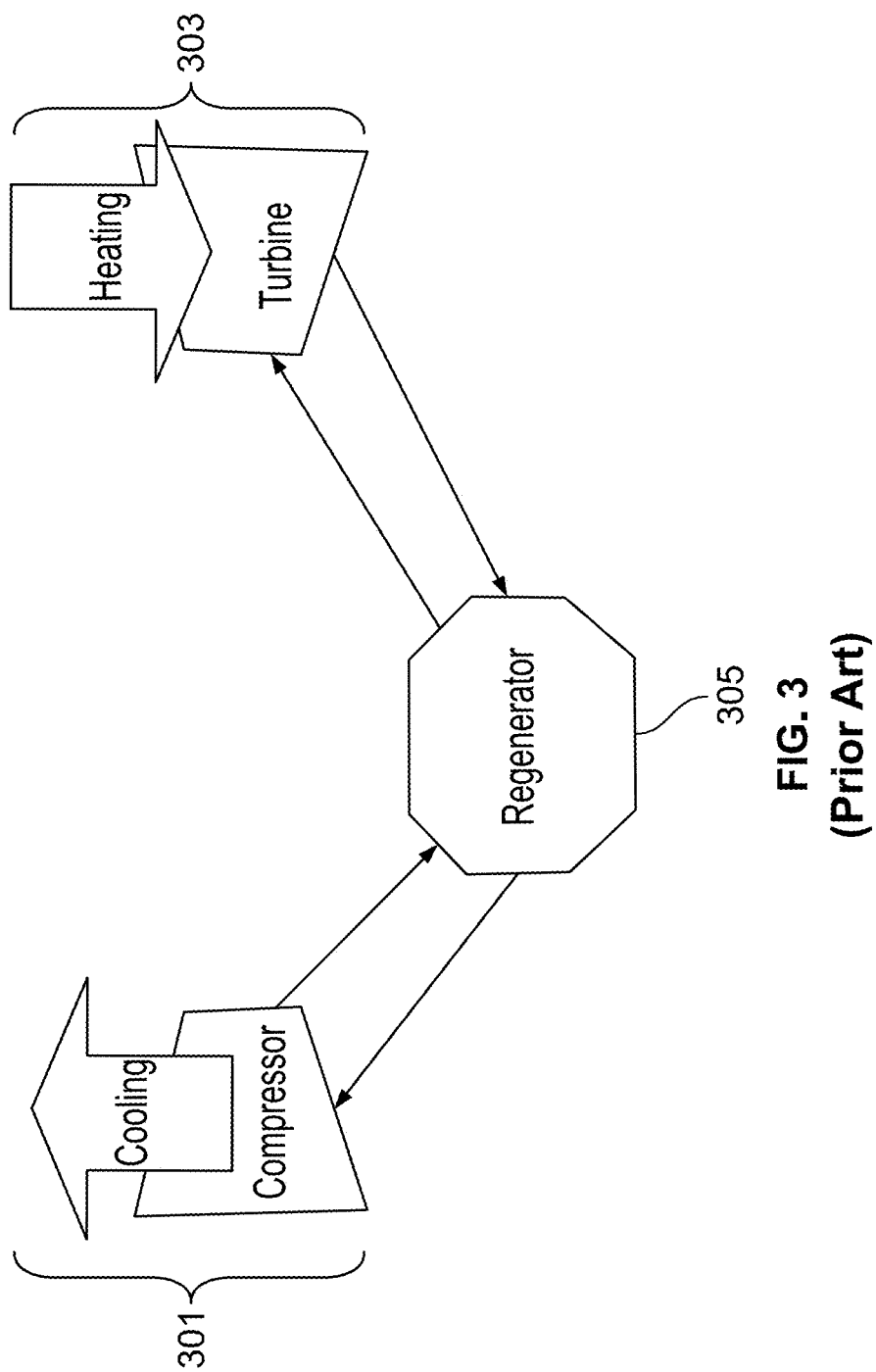
FIG. 3 illustrates the Ericsson Closed Cycle (Prior Art).
Figure 8:
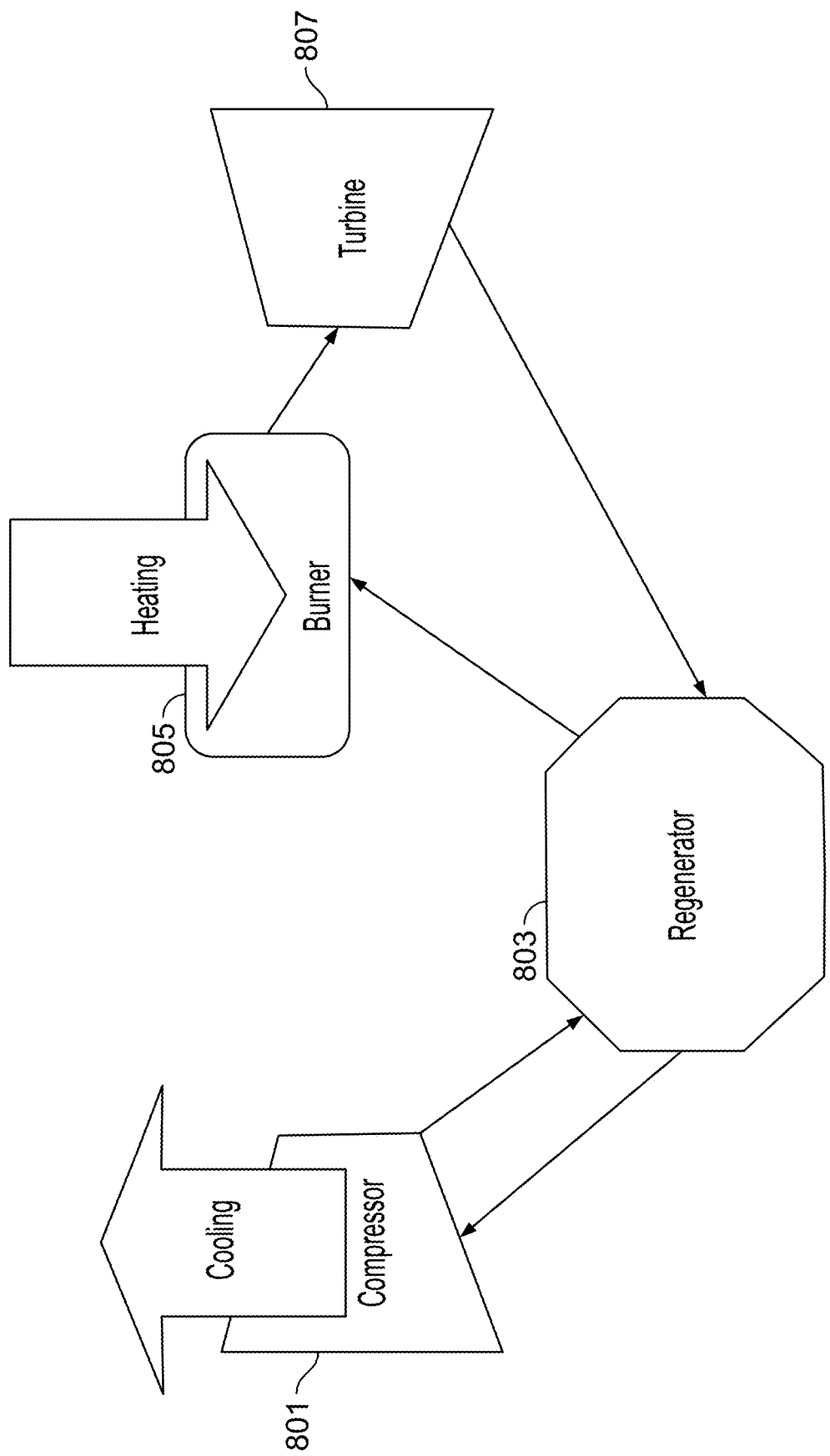
FIG. 8 illustrates a Novel Closed Cycle scheme according to an embodiment of the disclosure.

As depicted in FIG. 8, the baseline Novel Closed Cycle (n=1) utilizes compressor 801, regenerator 803, combustor 805 and turbine 807. The baseline Novel Closed Cycle (n=1) is similar to the Ericsson Cycle (ERC) of FIG. 3, except for expansion, which is adiabatic instead of ideally Isothermal. The internal combustion burner of FIG. 3 is replaced by either external combustion heater or renewable heat source, such as concentrated solar thermal (CST) or biogas burner or geothermal. In this embodiment, the exhaust from the turbine comprises hot air and is recompressed after passing through the regenerator. Water can be recaptured, if feasible and desirable, by cooling the external combustion burner exhaust, in the case that the fuel contains a large portion of methane. In another embodiment, the closed cycle may use air or any other gas, such as $CO_2$, for its operation.

Figure 9:
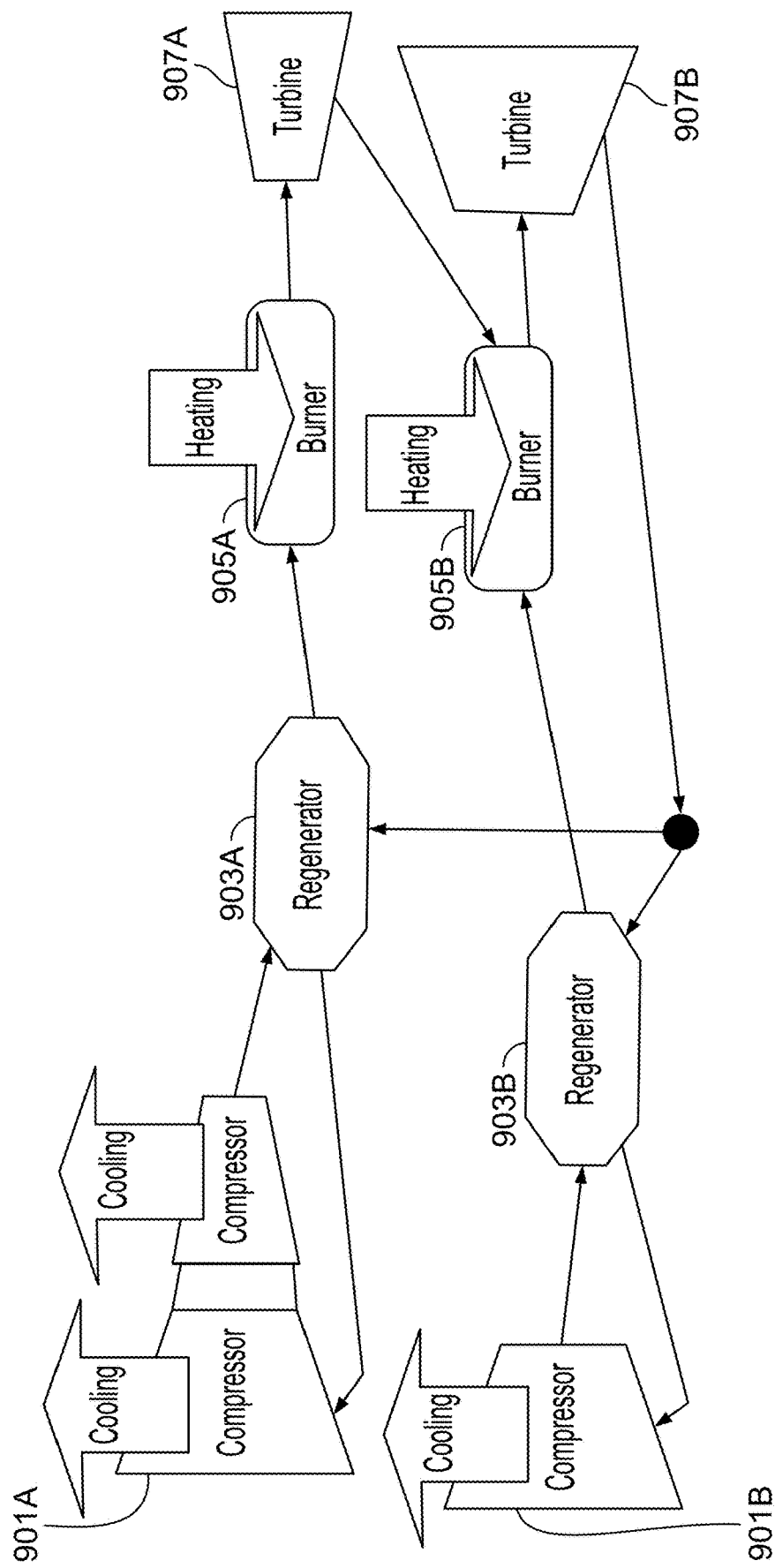
FIG. 9 illustrates a Novel Closed Cycle scheme according to an embodiment of the disclosure.

Referring now to FIG. 9, the illustrated two stage Novel Closed Cycle (n=2) utilizes compressors 901A and 901B, regenerators 903A and 903B, combustors 905A and 905B, and turbines 907A and 907B. In addition, each compressor may be single stage or multi-stage (in the example shown in this FIG. 9, compressor 901A is at least two stages and compressor 901B is at least a single stage). Further, the two stage Novel Closed Cycle (n=2) of FIG. 9 is similar to the Open cycle scheme of FIG. 6, except the fact that the turbine exhaust after similar splitting and regenerative cooling goes to respective compressors for recompression.

Figure 10:
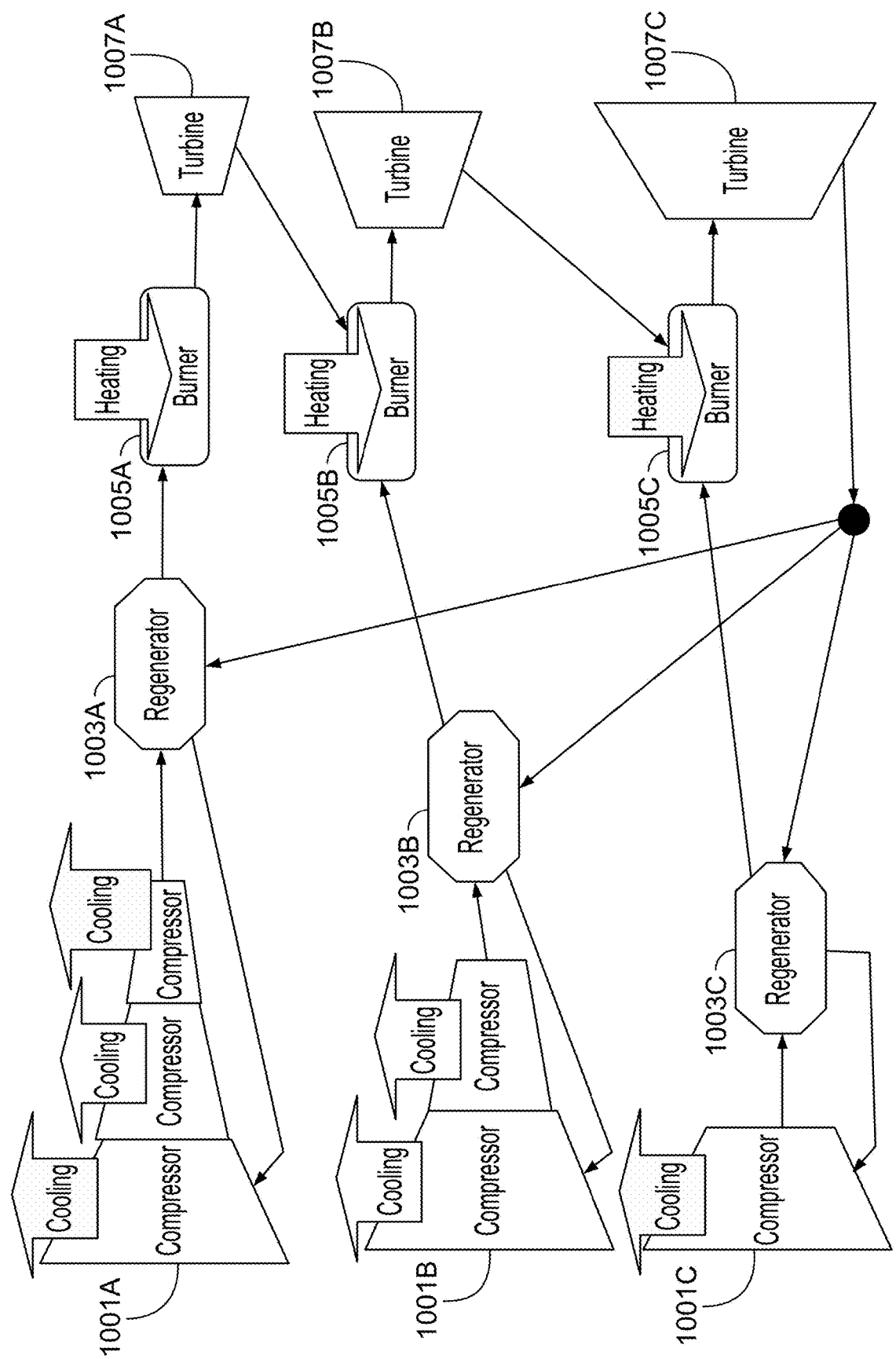
FIG. 10 illustrates a Novel Closed Cycle scheme according to an embodiment of the disclosure.

Referring now to FIG. 10, the illustrated three stage Novel Closed Cycle (n=3) utilizes compressors 1001A, 1001B and 1001C, regenerators 1003A, 1003B and 1003C, combustors 1005A, 1005B and 1005C, and turbines 1007A, 1007B and 1007C. In addition, each compressor may be single stage or multi-stage (in the example shown in this FIG. 10, compressor 1001A is at least three stages, compressor 1001B is at least two stages and compressor 1001C is single stage). Further, the three stage Novel Closed Cycle (n=3) of FIG. 10 is similar to the Open cycle scheme of FIG. 7, except the fact that the turbine exhaust after similar splitting and regenerative cooling goes to respective compressors for recompression.

It is apparent that the thermodynamics of both the "Closed" and "Open" schemes of the Novel Cycles is precisely same. As before, the cycles operate with the same compression pressure ratio $\pi$ and the same cycle temperature ratio $\theta$.

For fair comparison, performance of the Novel Cycles must be compared with the sum of n Ericsson cycles of similar complexity, cycle pressure ratio $\pi$ and cycle temperature ratio $\theta$. As n increases the Novel Cycle is expected to approach the Ericsson cycle but with fast diminishing improvement in both specific power and thermal efficiency. Therefore, in one example, n=2 or 3 is considered reasonable and sufficient for practical implementation. Appendix C provides a discussion of performance of various Novel Cycles according to embodiments of the disclosure.

In various embodiments, mechanisms are provided to address the changing global requirements, such as least specific $CO_2$ efflux, ability to work efficiently with renewable thermal energy (e.g., solar), adaptive designs for distributed generation/consumption patterns, minimization or elimination of use of water and acceptability through affordability to the global emerging markets.

In various embodiments, a compressor can be cooled externally by a coolant such as water or air. In one such embodiment, the cooling may be through a heat exchange across compressor external wall (the so-called inter-stage coolers or inter-coolers). In other embodiments, a compressor can be cooled internally by evaporation of a liquid, such as water or water-methanol mixtures. In other embodiments, the cooling may be external cooling and/or internal evaporative cooling. In another embodiment, the coolant may be one which consumes large energy for evaporation or Latent heat.

In other embodiments, renewable sources of energy may include: (a) Solar Thermal (e.g., concentrated solar thermal); (b) Geo-Thermal; (c) Biomass, in its numerous forms from animals and plants; and (d) Ocean temperature differences.

In another embodiment, concentrated solar thermal may be integrated with Internal/External Heating, the former obviating the need for a heat exchanger.

As described herein are mechanisms for, in essence, bridging the gap between the Brayton cycle and the Ericsson cycle by utilizing: (a) quasi-isothermal internally cooled compression; (b) staged expansion with parallel reheat loops; (c) successive expansion mass flow compounding at burners/heaters; and (d) exhaust splitting, recirculation, regeneration (recompression-closed cycle). In one embodiment, provided is networking of 3 regenerative, quasi-isothermal compression open cycles in series-parallel loops. In another embodiment, provided is networking of 3 regenerative, quasi-isothermal compression closed cycles in series-parallel loops.

Reference will now be made to some example applications of the Novel Cycles according to various embodiments of the disclosure.

The first of these applications is the use of coal as a gas turbine fuel. In this regard, the Novel Closed/Open Cycle Schemes may be applied to various futuristic requirements, such as converting an existing gas fired plant in an environmentally acceptable and commercially competitive manner by operating on cheaper and locally available fuel, such as coal.

Figure 11:
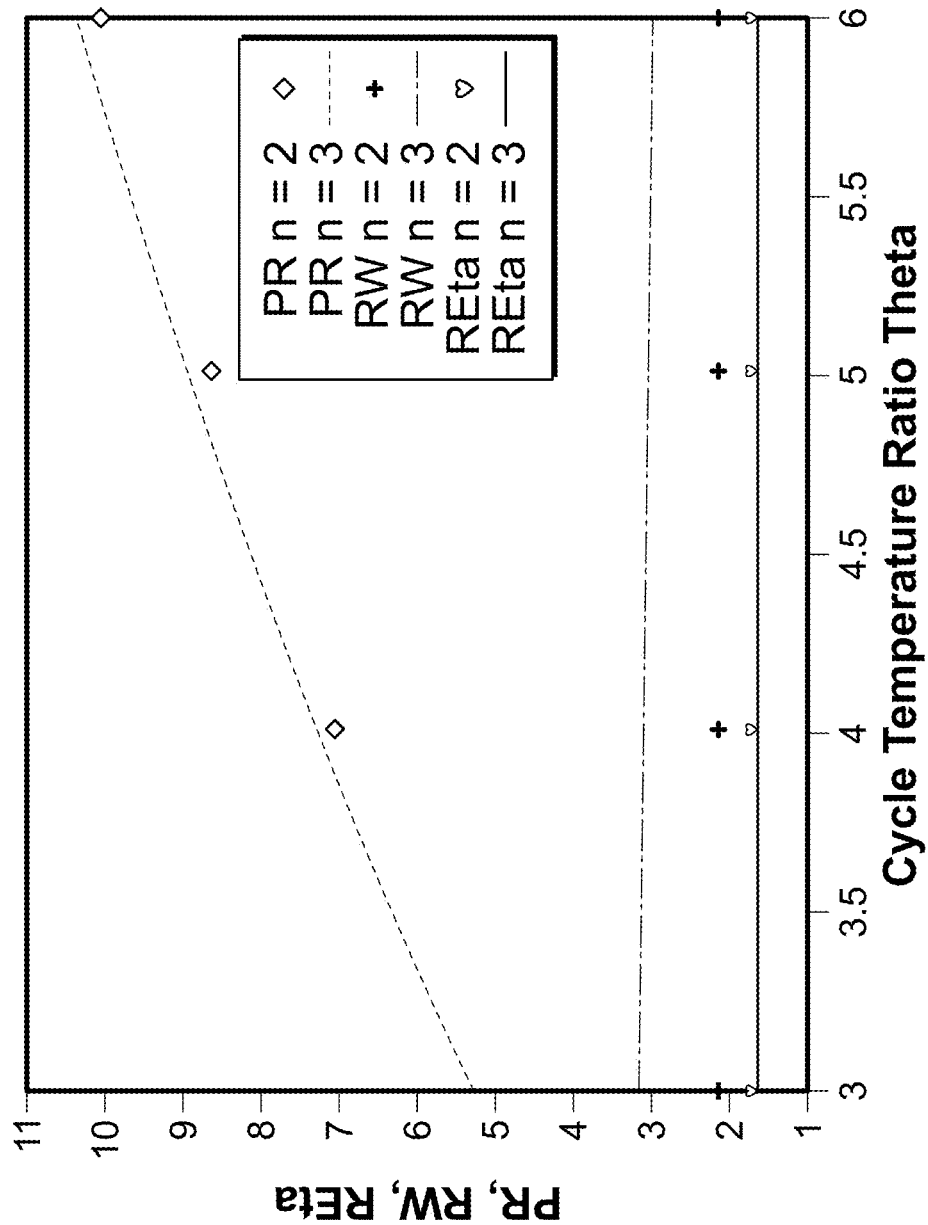
FIG. 11 illustrates a graph of Novel Cycle performance for coal according to an embodiment of the disclosure.

Referring to FIG. B-3 (of Appendix B), it is seen that for such conversion we have to increase the thermal efficiency 1.667 times, essentially by using the same turbo-machinery hardware of the existing plant. Compressor blades of the existing Gas-Fired plants can be utilized to construct a two or three stage compressor layout. Multiple units of the original turbine can be used. Relative values of specific power and pressure ratio for various values of cycle temperature ratio $\theta$ are presented in FIG. 11, when the relative thermal efficiency is 1.667 times the original baseline gas turbine. This is because burning of coal produces 1.667 times more $CO_2$ per unit heat of combustion as compared to methane, the main constituent of natural gas.

It may be noted that the relative specific power is doubled or tripled for n=2 and 3, which would justify the added complexity.

Another application is in the context of gas turbines for solar power. In this regard, the Novel Open and Closed Cycle Schemes may be utilized, for example, in concentrated solar thermal power applications. Currently, many solar or solar-fuel hybrid designs are being explored around existing gas turbine hardware or otherwise [2, 4, 5]. For open cycle schemes [4], the typical cycle temperature ratio is about 3 to 4.5 and pressure ratios are moderate at about 9 to 15. For supercritical $CO_2$ based closed cycles [5], the typical cycle temperature ratio is about 3 and pressure ratios are low at about 3 to 6. In one example, the Novel Open and Closed Cycle schemes may be applied to such applications. The simulated performance of these Novel Cycles for the modest cycle temperature ratio of $\theta=3$ and cycle pressure ratios from $\pi=3$ to 15 is presented in FIG. 12. Here the specific power and thermal efficiency of the Novel Cycles as referenced to the baseline Brayton cycle for same $\pi$ and $\theta$ is denoted by 'RW' and 'REta' respectively. The data is presented for n=2 and 3.

Figure 12:
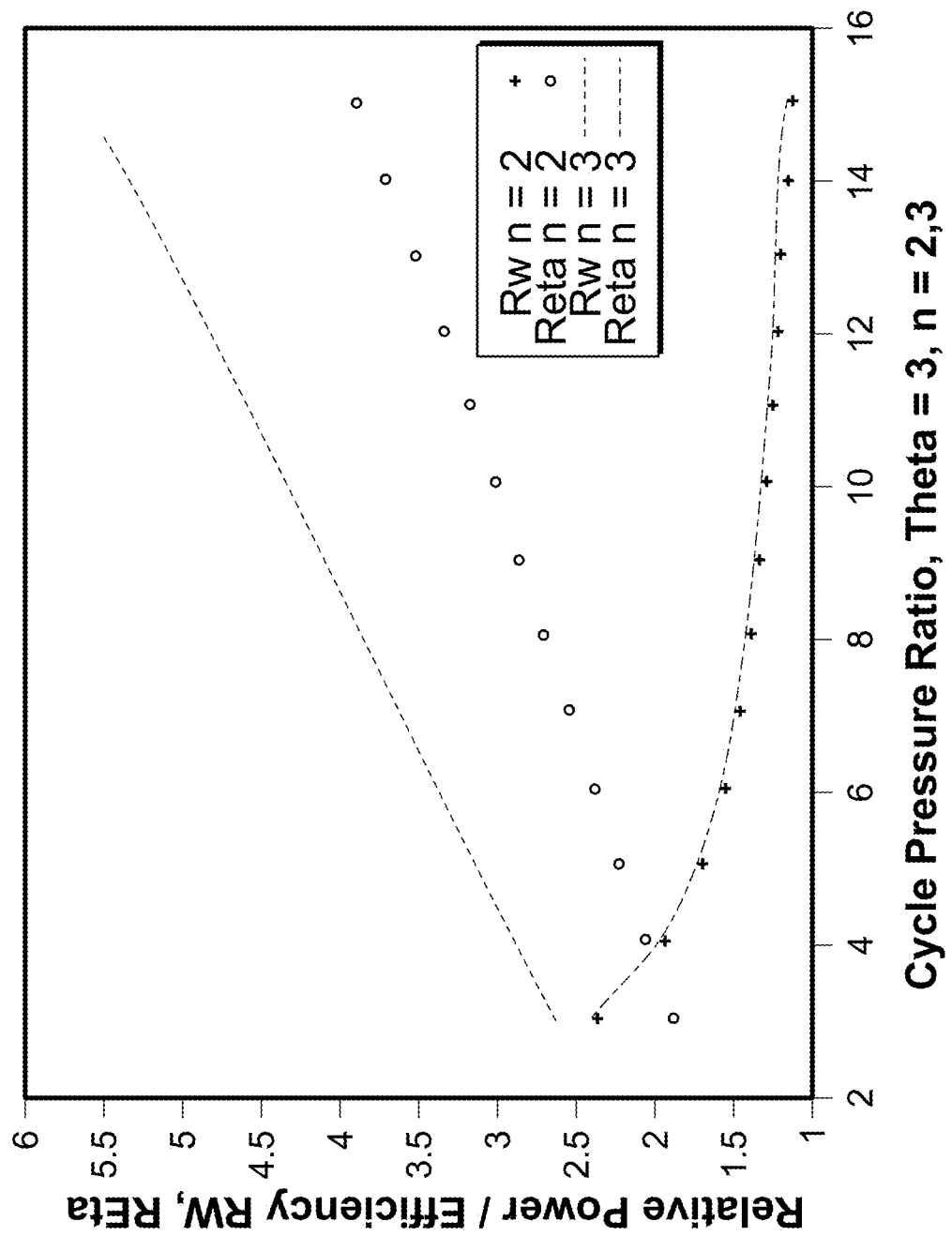
FIG. 12 illustrates a graph of Novel Cycle performance for solar thermal energy according to an embodiment of the disclosure.
Figure 13:
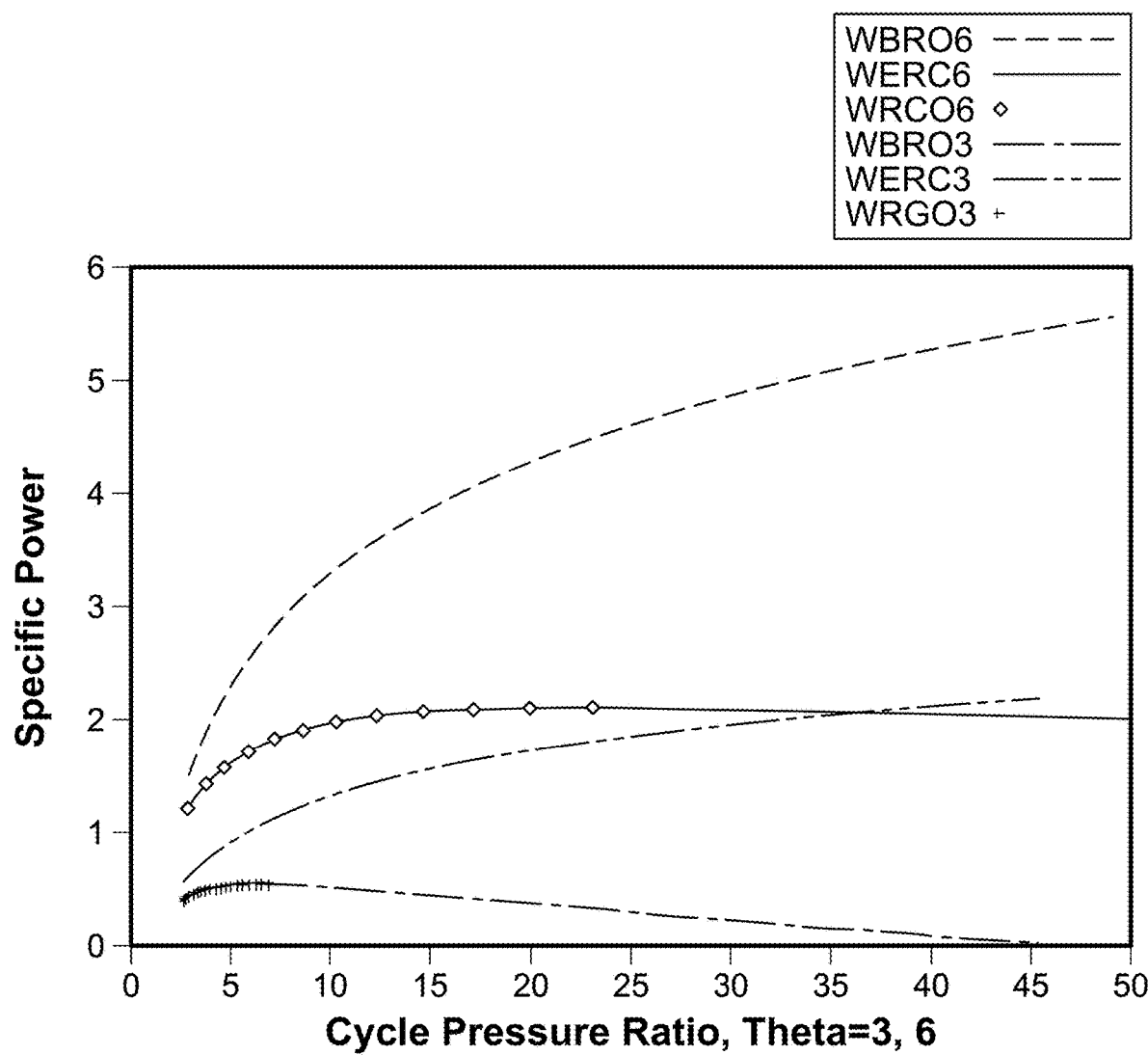
FIG. 13 (referred to in Appendix B as FIG. B-1) shows the Variation of Specific Power $\bar{\omega}$ (Theta=$\theta$).
Figure 14:
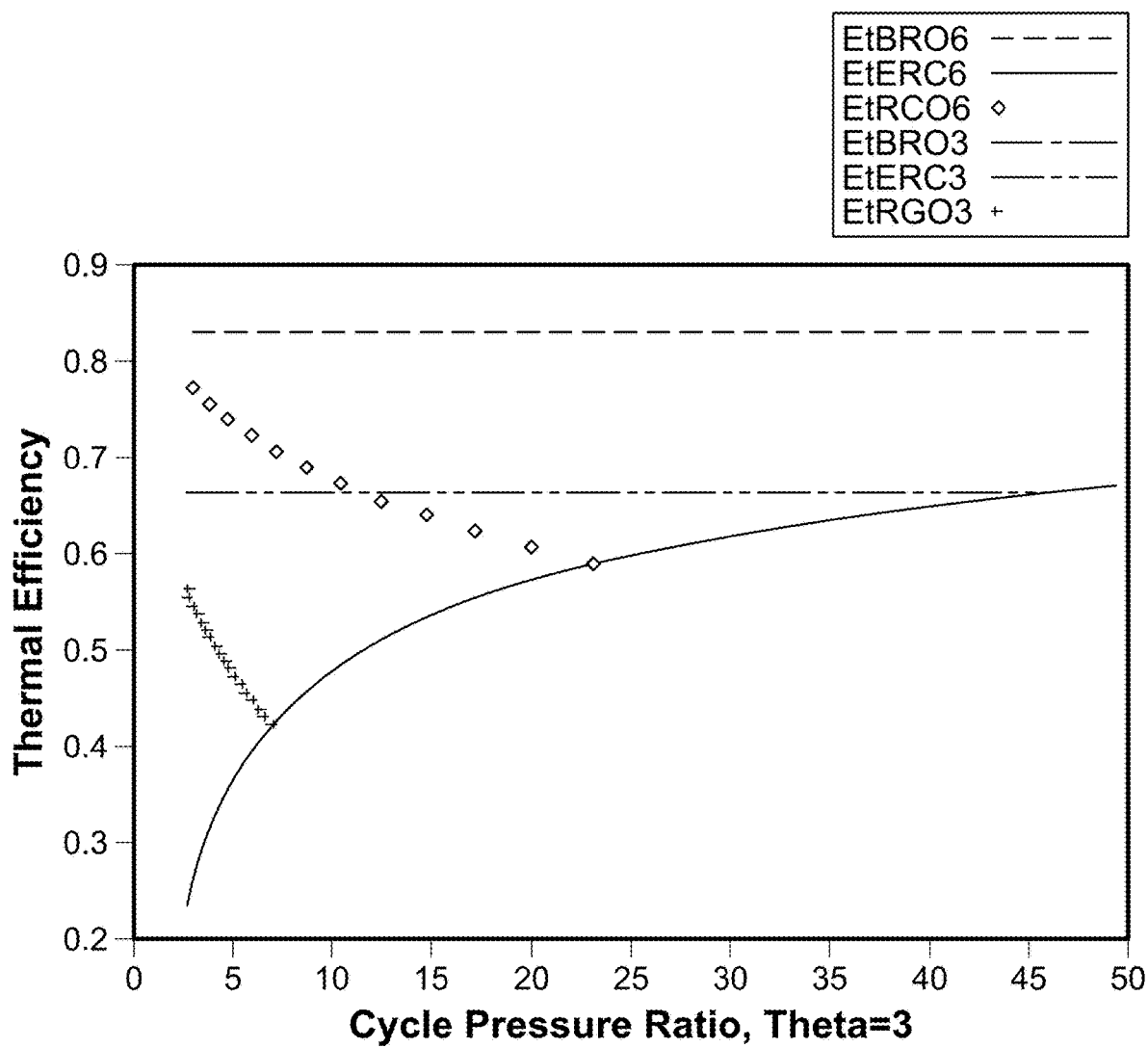
FIG. 14 (referred to in Appendix B as FIG. B-2) illustrates the Variation of Thermal Efficiency $\eta$=Et, Theta=$\theta$.
Figure 15:
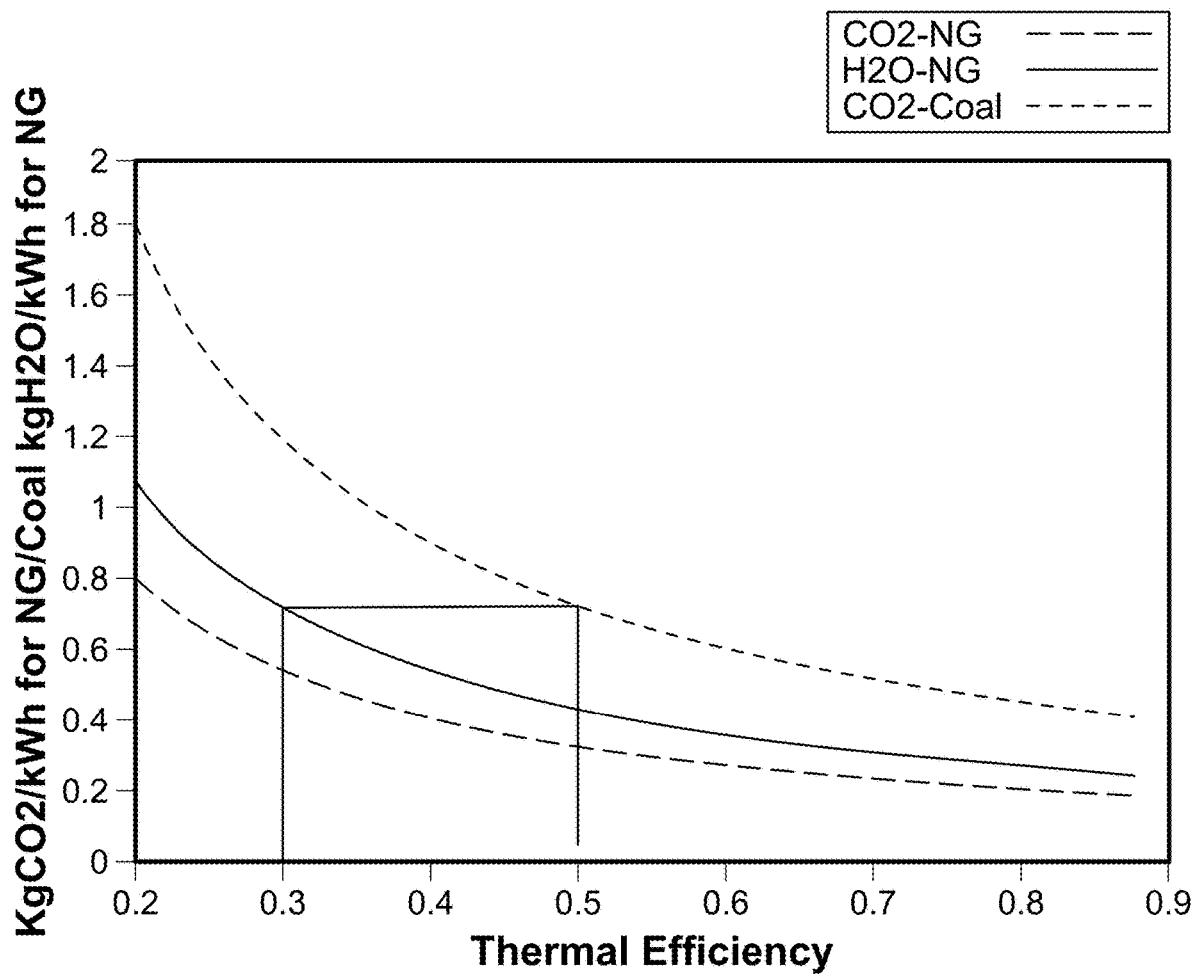
FIG. 15 (referred to in Appendix B as FIG. B-3) illustrates the Sensitivity of $CO_2$ and $H_2O$ Efflux with $\eta$.
Figure 16:
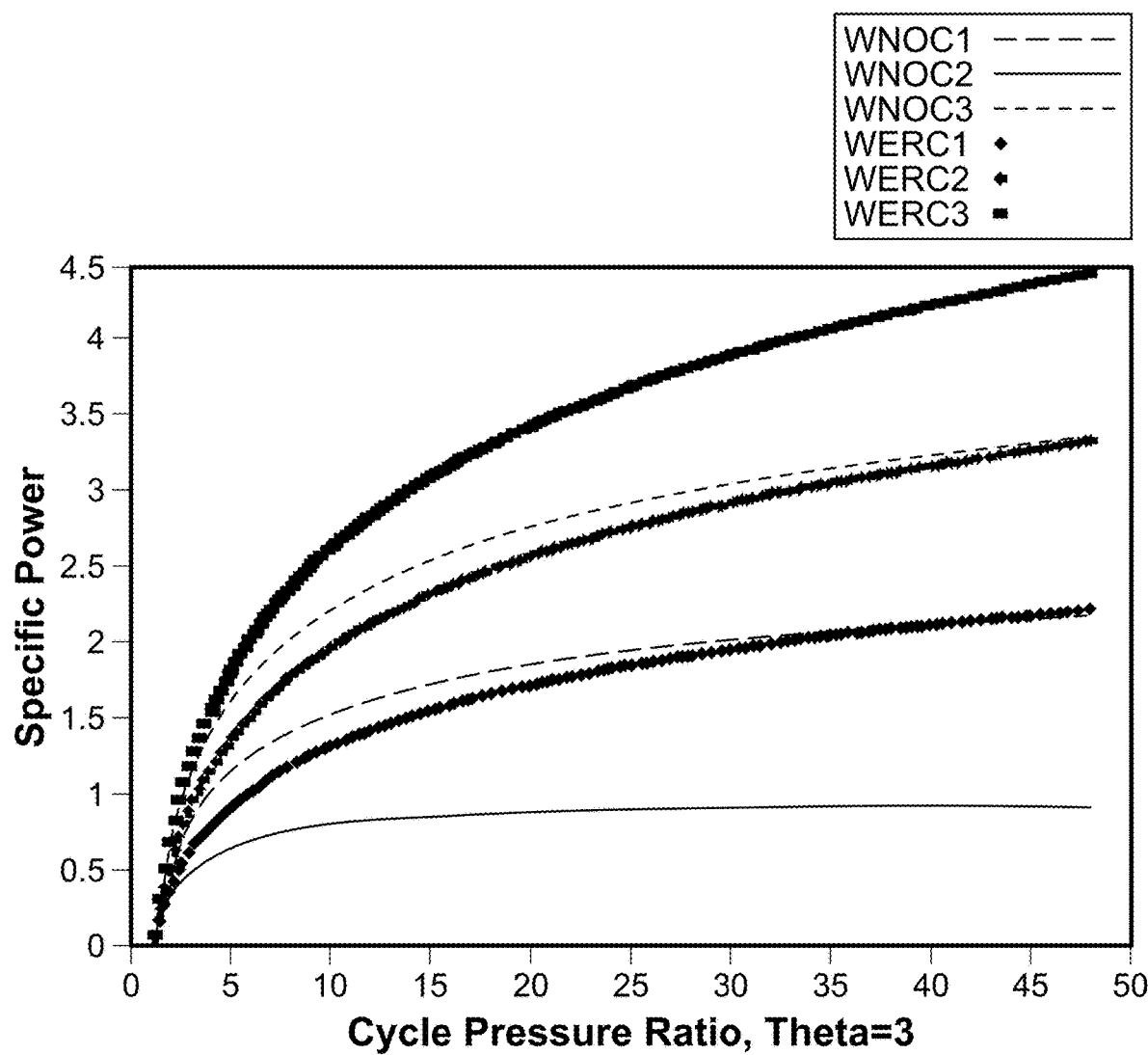
FIG. 16 (referred to in Appendix C as FIG. C-1($a$)) illustrates the Variation of Specific Power for Theta=$\theta$=3.
Figure 17:
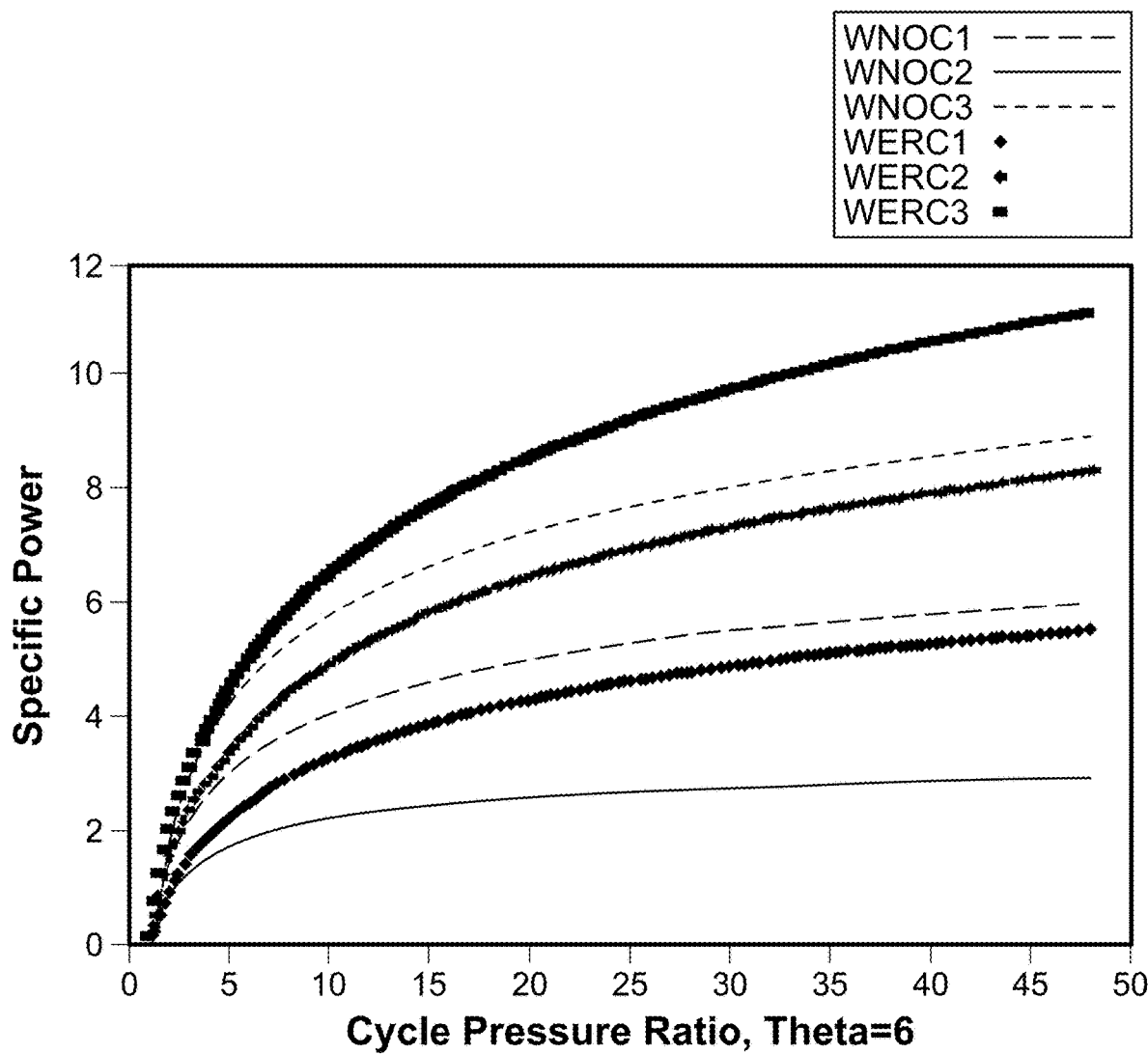
FIG. 17 (referred to in Appendix C as FIG. C-1($b$)) illustrates the Variation of Specific Power for Theta=$\theta$=6.
Figure 18:
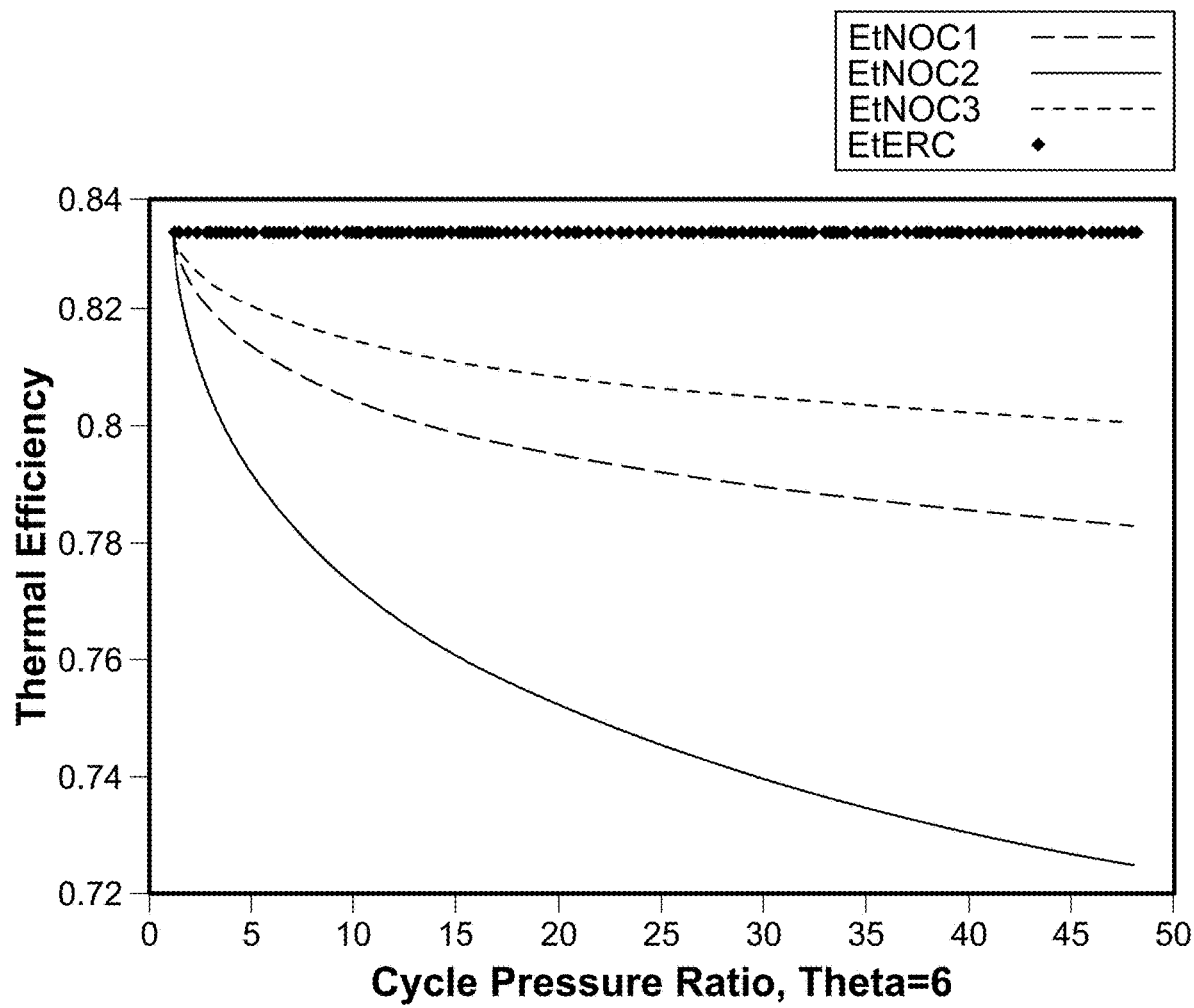
FIG. 18 (referred to in Appendix C as FIG. C-2($a$)) illustrates the Variation of Thermal Efficiency for $\theta$=6$\eta$=Et.
Figure 19:
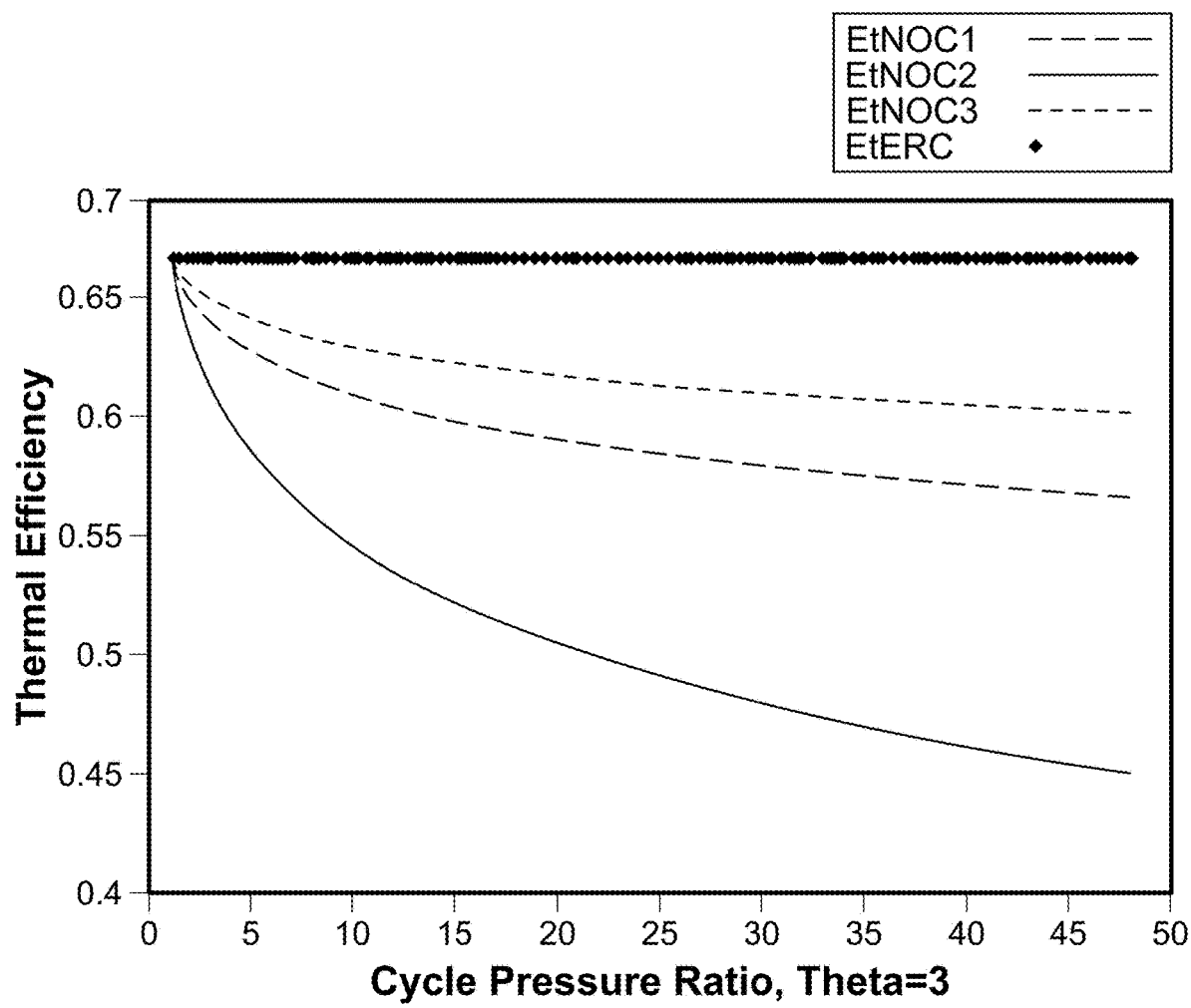
FIG. 19 (referred to in Appendix C as FIG. C-2($b$)) illustrates the Variation of Thermal Efficiency for $\theta$=3 ($\eta$=Et).
Figure 20:
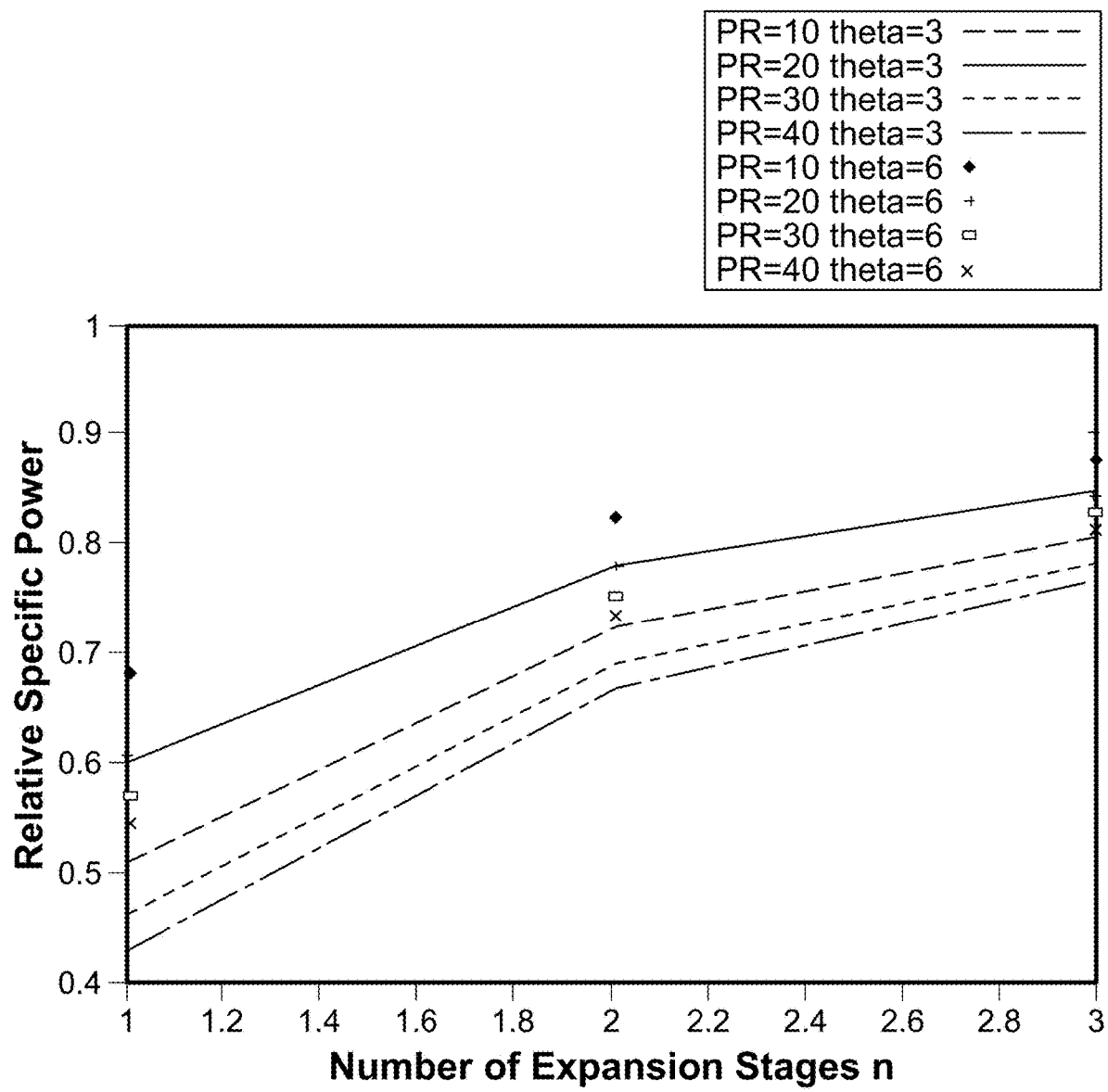
FIG. 20 (referred to in Appendix C as FIG. C-3) illustrates the Relative Specific Power $\bar{\omega}/\bar{\omega}_{ERC}$ with n.
Figure 21:
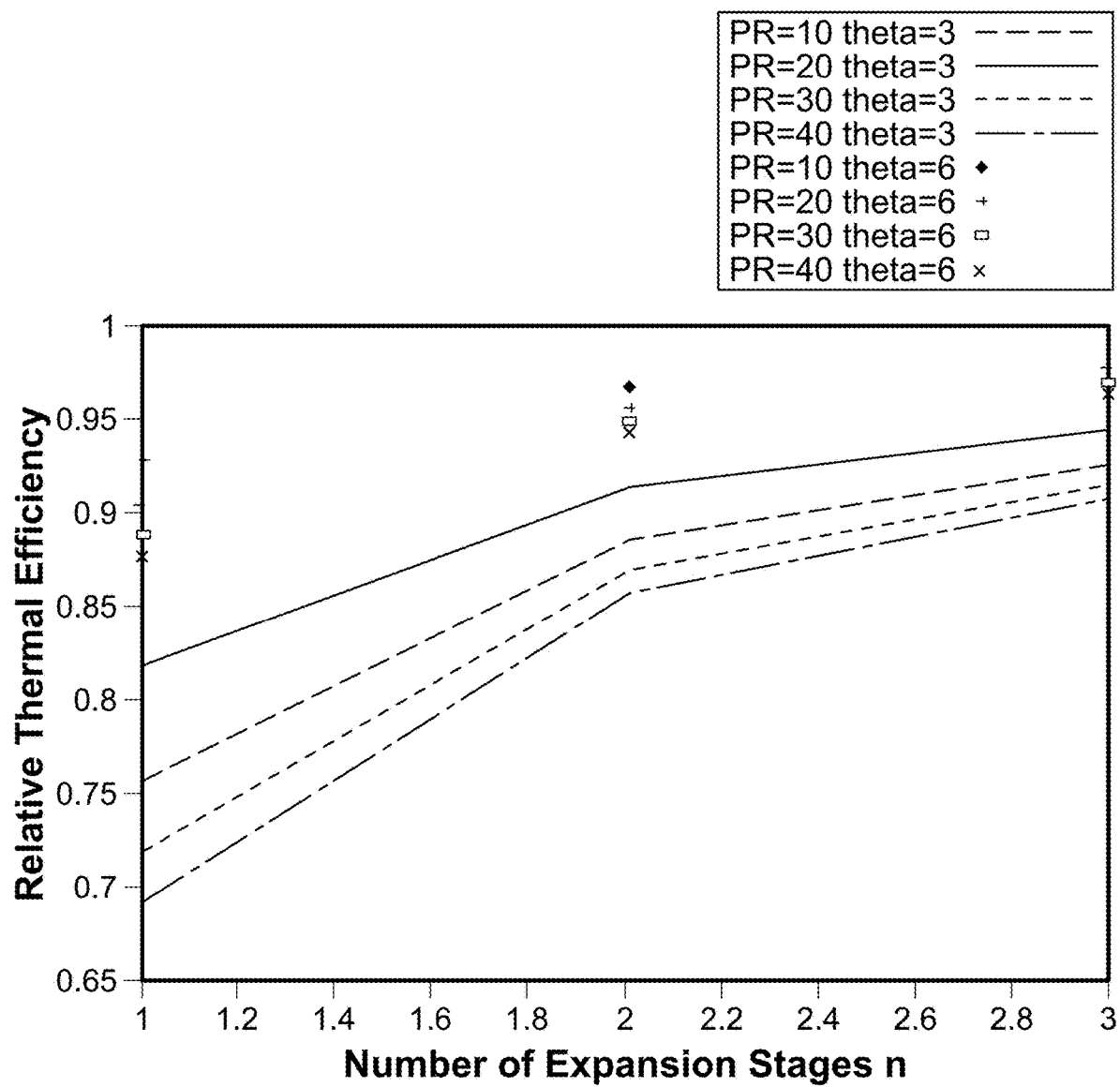
FIG. 21 (referred to in Appendix C as FIG. C-4) illustrates the Relative Thermal Efficiency $\eta/\eta_{ERC}$ with n.
Figure 22:
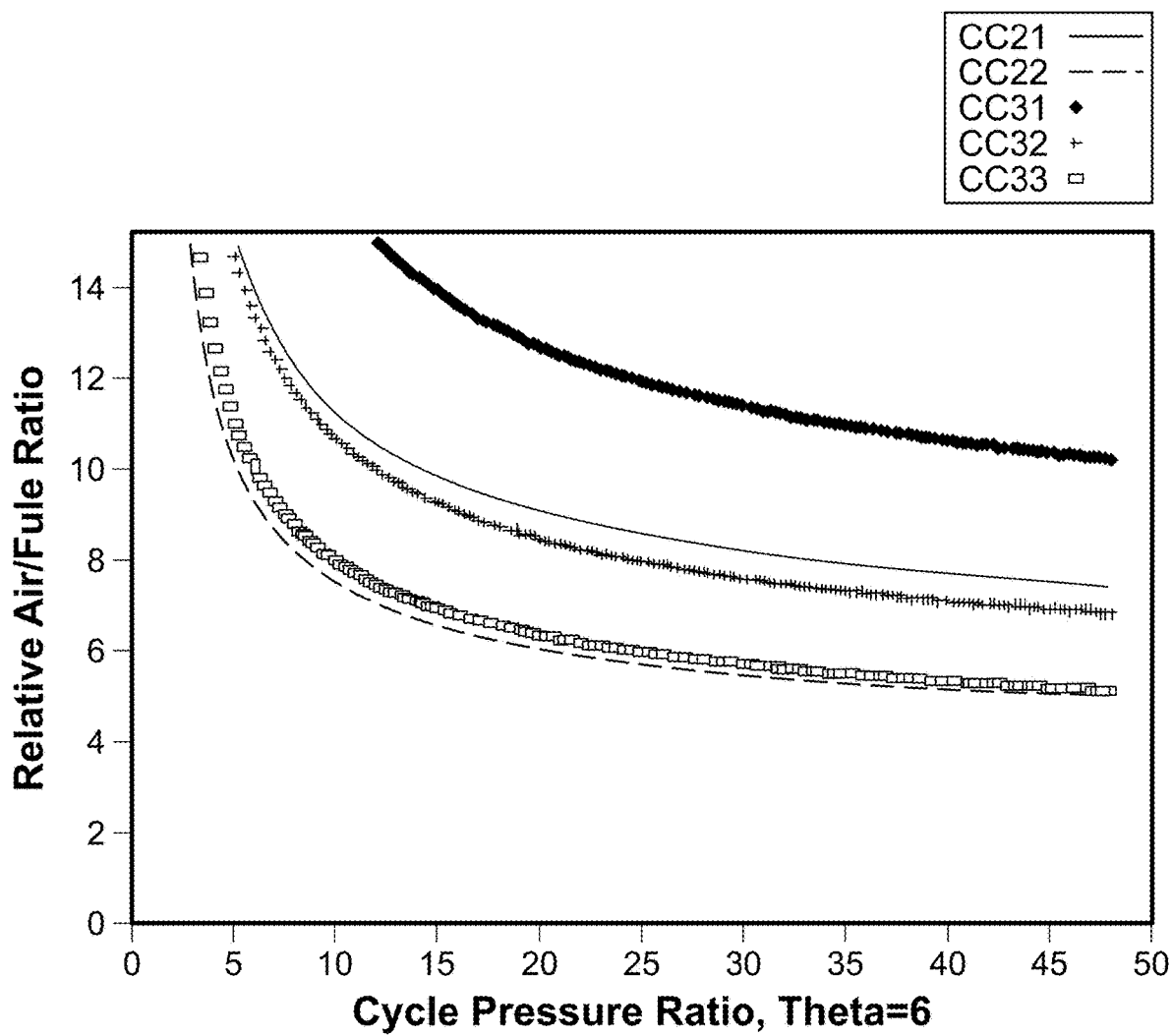
FIG. 22 (referred to in Appendix C as FIG. C-5) illustrates the Variation of Relative Air to Fuel Ratio.

As seen from FIG. 12, the Novel Open and Closed Cycle Schemes give high specific power for all pressure ratios, albeit at increased complexity. The thermal efficiency of these cycles is far superior (150-240%) at low pressure ratios (3 to 6) and is about 11-15% higher at high pressure ratio of 15 for n=2 and 3. Thus, the Novel Cycles are well-suited to the supercritical $CO_2$ based closed cycles. In this example, compressors can be cooled only externally.

As mentioned above, for simplicity only, the various Novel Cycle concepts are illustrated under ideal conditions of perfect processes and constant properties. In this regard, it is believed that since the ideal cycle analysis with constant properties and mass flow rates correctly captures the performance trends for specific power and thermal efficiency, these trends will be consistent under real cycle conditions. Based upon the analysis and limited simulation results presented herein the following four major conclusions can be drawn:

(1) The Novel Open and Closed Cycle Schemes, as analysed, satisfy the basic object of simultaneously achieving high specific power and thermal efficiency without the bottoming Rankine cycle.

(2) The Novel Cycle concepts provide the necessary flexibility for choosing the design values of cycle pressure ratio $\pi$ and cycle temperature ratio $\theta$, while optimizing the cycle for specific requirements, such as preferred energy source (e.g., coal, natural gas or concentrated solar thermal), water conservation (such as for arid areas) and/or water generation.

(3) The Novel Cycles are suited, for example, for small/medium plants with low pressure/temperature ratios as preferred options under a distributed generation/consumption model.

(4) Principles of Component Commonality to reduce overall acquisition costs and improve affordability have been established and may be considered for future plant configurations.

In one embodiment, the multiloop gas turbine has each loop comprising at least one compressor to draw air or other gas for combustion purpose, a coolant to cool the compressed air or other gas, a regenerator to admit compressed air or other gas as well as hot expanded air or other gas from a turbine of the ultimate loop in separate passages with heat conducting walls, a combustion unit for combustion of compressed air or other gas and a fuel, and at least one turbine, wherein exhaust flow of the turbine of the preceding loop is routed to the combustion unit of the next loop, allowing mixing of exhaust flow of the first loop with the hot compressed air or other gas of the next loop, wherein the hot expanded exhaust from the turbine of the ultimate loop is fed back into the regenerators of each loop to recover exhaust heat thereby enhancing efficiency, and wherein the coolant is recaptured from the regenerator of each loop.

In various embodiments, the multiloop gas turbine is an open cycle or closed cycle turbine. In an embodiment of the open cycle multiloop gas turbine, the combustion unit is, but not limited to, an internal combustion burner. In an embodiment of the closed cycle multiloop gas turbine, the combustion unit is, but not limited to, an external combustion heater or a renewable heat source, such as solar or geothermal. The compressors may be internally cooled by the coolants, such as by spraying water. The water may be recaptured from regenerator exhaust flow.

In one example, the multiloop gas turbine is a three-loop gas turbine and includes three-stage compressors at the first loop, two-stage compressors at the second loop, and a single compressor at the third loop.

In another example, the multiloop gas turbine is a two-loop gas turbine and includes two-stage compressors at the first loop and a single compressor at the second loop.

Also disclosed herein is a method of operating a multiloop gas turbine by: (i) producing an exhaust from a turbine of a preceding loop, (ii) routing the exhaust of a preceding loop to a heating unit of a next loop, allowing mixing of exhaust flow of the first loop with the hot compressed air or other gas of the next loop, (iii) feeding back the hot expanded exhaust from the turbine of the ultimate loop back into the regenerators of each loop to recover thermal energy and thereby enhancing efficiency, and (iv) recapturing water from each loop for recycling the same for cooling after purification, if required. In an open cycle operation with natural gas as the fuel there is typically enough water generated, which can be captured and used, especially in arid areas.

In one embodiment, all of the compressors operate with same mass flow and inlet conditions. In this embodiment, the compressor in the first loop (of a three loop configuration) may be a three-stage compressor, each compressor stage having pressure ratio of $\pi^{1/3}$. The compressor in the second loop of this embodiment may be a two-stage compressor, each compressor stage having pressure ratio of $\pi^{1/3}$. In the third loop of this embodiment, there is only one compressor stage. The turbines of this embodiment operate with same pressure ratio and same entry temperature. All regenerators of this embodiment have identical hot-side flow conditions. On the cold-side, the mass flow rates and temperatures are identical; however, the pressures are different as $\pi P_o$, $\pi^{2/3} P_o$ and $\pi^{1/3} P_o$ respectively. All the heating units of this embodiment operate between the same temperature limits but differ in mass flow capacities and pressure levels. The heating unit in the first loop of this embodiment operates with mass flow w at pressure $\pi P_o$. The number heating units of this embodiment is same as the number of turbines.

In an embodiment, the turbine blades (e.g., rotor blades, stator blades) described herein of any one or more compression/expansion stages may be substantially the same (e.g., in terms of dimensions such as size, shape and weight and in terms of materials).

In an embodiment, the turbine blades may be the same or different.

In an embodiment, the compressor blades (e.g., rotor blades, stator blades) described herein of any one or more compression/expansion stages may be substantially the same (e.g., in terms of dimensions such as size, shape and weight and in terms of materials).

In an embodiment, the compressor blades may be the same or different.

In an embodiment, the regenerators described herein of any one or more compression/expansion stages may be substantially the same (e.g., in terms of dimensions such as size, shape and weight and in terms of materials).

In an embodiment, the regenerators may be the same or different.

In an embodiment, the combustion units (e.g., burners) described herein of any one or more compression/expansion stages may be substantially the same (e.g., in terms of dimensions such as size, shape and weight and in terms of materials).

In an embodiment, the combustion units may be the same or different.

The Novel Closed/Open Cycles substantially enhance the performance in terms of both efficiency and specific power.

The present invention is cost-effective, especially if the power generation system utilizes component commonality. The major cost component of gas turbine hardware is the number of different types of rotor and stator blades of axial flow compressors and turbines, especially for the internally cooled turbine. Using the same or substantially similar components such as similar compressor blades, similar turbine blades, similar regenerators, similar combustion units and the like will reduce the overall cost as the onetime "NRE" cost of masters, dies, jigs and fixtures, machine-tools and balancing rigs is shared. This feature is illustrated herein for the major components.

APPENDIX A

Nomenclature
A—Flow area in $m^2$
B—Burner
BRO—Brayton Open Cycle
C—Compressor
CC—Combustion Chamber
$C_p$—Specific Heat at constant pressure in kJ/kg/K
$C_v$—Specific Heat at constant volume in kJ/kg/K
ERC—Ericsson Cycle
Et, Eta—Thermal efficiency same as $\eta$
GT—Gas Turbine
Ln—natural logarithm
m—running stage number
MJ—Mega Joules
n—number of expansion/compression stages
NCn—Novel Closed cycle of n stages
NG—natural gas
NOn—Novel Open cycle of n stages
NOCn—Novel Open/Closed cycle of n stages
NRE—non recurring equipment
$P_o$—ambient pressure in kPa
$P_{max}$—maximum cycle pressure in kPa
$P_{min}$—minimum cycle pressure in kPa
PR—cycle or compression pressure ratio same as $\pi$
$Q_B$—rate of heat supplied in kW
$Q_{BT}$—total rate of heat supplied in kW
$Q_T$—rate of heat supplied to turbine in kW
R—gas constant in kJ/kg/K
REta—relative thermal efficiency referred to simple Brayton cycle RGi—regenerator number i
RW—relative specific power referred to simple Brayton cycle
T—turbine
$T_{max}$—maximum cycle temperature in K
$T_{min}$—minimum cycle temperature in K
To—ambient temperature in K
w—air mass flow rate in kg/s
$W_C$—compression power in kW
$W_{CE}$—compression power in Ericsson cycle in kW
$W_{Cm}$—compression power of mth stage in kW
$W_{CT}$—total compression power in kW
$W_{Cy}$—cycle power in kW
$W_T$—turbine power in kW
$W_{TE}$—turbine power in Ericsson cycle in kW
$W_{TT}$—total turbine power in kW
$\gamma$—ratio of specific heats
$\eta$—thermal efficiency
$\pi$—cycle or compression pressure ratio
$\tau$—adiabatic compression temperature ratio
$\theta$—cycle temperature ratio
$\bar{\omega}$—cycle specific power non-dimensional form or referred to $WC_pT_o$

APPENDIX B

It can be analytically established that relative specific cycle power $\bar{\omega}$ (in non-dimensional form or referred to $wC_pT_o$) and the cycle thermal efficiency $\eta$ for the BRO, ERC and RGO cycles are:

$$\bar{\omega}_{BRO}=(\theta-\tau)(1-1/\tau); \eta_{BRO}=1-1/\tau \quad (1a)$$

$$\bar{\omega}_{ERC}=[(\theta-1)\text{Ln}(\tau)]; \eta_{ERC}=1-1/\theta \quad (1b)$$

$$\bar{\omega}_{RGO}=(\theta-\tau)(1-1/\tau); \eta_{RGO}=1-\tau/\theta \quad (1c)$$

Assuming ambient temperature $T_o=300$ K, for typical high/low values of $\theta=6$ ($T_{max}=1800$K) and $\theta=3$ ($T_{max}=900$K), the behavior of $\bar{\omega}$ and $\eta$ of the above three cycles is presented on FIG. B-1 and FIG. B-2, for typical variation of cycle pressure ratio $\pi$.

Sensitivity of $CO_2$ Efflux

Consider two typical fossil fuels Coal and Natural Gas. As per [3] the specific $CO_2$ in (g/MJ) is about 100 for Coal and 60 for Natural Gas, which works out in (kg/kWh) to about $(0.36/\eta)$ for coal and $(0.216/\eta)$ for Natural Gas. The specific water generated with Natural gas as fuel will be about $(0.162/\eta)$ in (kg/kWh) which is not a small quantity to be ignored, where material. FIG. B-3 presents the variation in specific $CO_2$ and $H_2O$ with thermal efficiency for these fuels. In order that Coal based plants compare with Natural Gas, these must operate with about 67% higher thermal efficiency (30%→50%) to be environmentally competitive.

APPENDIX C

Generic Novel Cycle Performance (NOCn)

It can be analytically established that relative specific cycle power $\bar{\omega}$ (in non-dimensional form or referred to $WC_pT_o$) and the cycle thermal efficiency $\eta$ for both the novel closed and novel open generic cycles (NOCn) and n equivalent Ericsson cycles (ERCn) are:

$$\bar{\omega}_{NOCn}=\frac{1}{2}\cdot n\cdot(n+1)\cdot[\theta(1-1/\tau^{1/n})-\text{Ln}(\tau^{1/n})] \quad (2a)$$

$$\bar{\omega}_{ERCn}=\frac{1}{2}\cdot(n+1)\cdot(\theta-1)\cdot\text{Ln}(\tau) \quad (2b)$$

$$\eta_{NOCn}=\{1-\text{Ln}(\tau^{1/n})/[\theta(1-1/\tau^{1/n})]\} \quad (2c)$$

$$\eta_{ERCn}=1-1/\theta \quad (2d)$$

n=1, 2, 3, . . . .

For the same typical high/low values of $\theta=6$ and $\theta=3$, considered earlier, the behavior of $\bar{\omega}$ and $\eta$ is presented on FIGS. C-1(a), C-1(b), C-2(a), and C-2(b) for the same typical variation of cycle pressure ratio $\pi$.

The changes in specific power and thermal efficiency, as referenced to sum of n equivalent Ericsson cycles for same $\pi$ and $\theta$, with n compression/expansion stages and typical pressure ratios $\pi=10, 20, 30, 40$ and $\theta=3$ and 6, are presented on FIG. C-3 and FIG. C-4.

Relative Air to Fuel Ratios

Methane will need more oxygen to burn compared to coal. Although, higher hydrocarbon components will need still more oxygen than methane, their mass fractions are very small. For simplicity the fuel is considered as methane only. The variation of Relative Air to Fuel Ratio for two and three stage expansion in the Combustion Chambers (CCnm) for the Novel Generic Open Cycle schemes are presented for the high value of $\theta=6$ in FIG. C-5. It is clear that the Air to Fuel mixture will get richer in the successive burners due to mixing of the turbine exhaust of the previous stage. The Relative Air to Fuel Ratio for the last burner must be in the feasible range of stable and complete combustion. The issue will be less material for smaller values of θ and immaterial for closed cycles with external heating.

Discussion of Results of Limited Simulation

Refer to FIGS. C-1(a), C-1(b), C-2(a), and C-2(b). The basic objective, set forth for the Novel Gas Turbine Cycles, of achieving simultaneously high specific power and closer to Carnot thermal efficiency without a bottoming Rankine cycle, has been realised in substantial measure. Specific power monotonically increases with pressure ratio and thermal efficiency decreases but the rate of increase in specific power is much higher in contrast to fall in thermal efficiency. As the number of compression/expansion stages increase from 1 to 2 to 3, the difference between the specific power of the generic cycle and the equivalent sum of Ericsson cycles reduces. The thermal efficiency trends are also similar.

Refer to FIG. C-3. Relative specific power, of the novel cycles referenced to equivalent sum of Ericsson cycles, approaches to 87% at high value of θ=6 at lowest considered pressure ratio of π=10. This reduces to about 82% for the highest pressure ratio considered of π=40. For the low value of θ=3 these numbers are 85% and 76% respectively.

Refer to FIG. C-4. Thermal efficiency increases with the number of compression/expansion stages n and approaches Carnot limit. For n=3, the % difference being about 2-3% for θ=6 and 6-9% for θ=3. The point to be noted is that the thermal efficiency of the novel cycles is closest to Ericsson cycle efficiency at lowest considered pressure ratio of π=10 with highest possible specific power for all cycle temperature ratios θ. The choice of lowest pressure ratio will be governed by acceptable specific power.

Refer to FIG. C-5. The Relative Air to Fuel Ratio even for high value of θ=6 may become restrictive only for very high values of compressor pressure ratio and that too for the last burner. Thus, this is not a restriction, when it comes to optimizing the novel generic cycle configurations.

Principles of Component Commonality

As established, the Novel Closed/Open Cycles substantially enhance the performance in terms of both efficiency and specific power, albeit with increased layout complexity and number of rotating and stationary components. This is also the case with the Combined Cycle schemes and the sum of equivalent Ericsson cycles scheme considered above for comparison. The major cost component of Gas Turbine hardware is the number of different Types of rotor and stator blades of axial flow compressors and turbines, especially for the cooled turbine. Using more number of the same components will reduce the overall cost as the onetime NRE cost of 'masters', 'dies', jigs and fixtures, machine-tools and balancing rigs is shared. This feature is illustrated for the major components.

Rotating Components

Compressors: For example, refer to FIG. 7 or FIG. 10 with n=3. All compressors operate with same mass flow and inlet conditions. Compressor of the first loop is a three stage compressor, say, C1, C2 and C3 in series, each with a pressure ratio of $\pi^{1/3}$. The second loop compressor comprises C1 and C2 in series, each with a pressure ratio of $\pi^{1/3}$. The third loop compressor is just C1 with a pressure ratio of $\pi^{1/3}$. Thus we need the more of same set of rotor and stator blades, as in the baseline cycle with the total compressor hardware being (3C1+2C2+C3).

Turbines: The commonality in turbines is not evident from the scheme shown on FIG. 7 or FIG. 10. It may be noted that all turbines operate with the same pressure ratio $\pi_T = \pi^{1/3}$ and same entry temperature of $\theta T_o$. It may be noted that each successive turbine stage has to handle the cumulative mass flow and the pressure level will reduce by $\pi_T$. Following the principles of thermodynamics of isentropic compressible flow, it can be shown that the turbine flow area required for the turbines T1, T2 and T3 will be:

$$A_{T1} \propto \{[W(R\theta T_o)^{1/2}]/[\pi P_o f(\pi_T, \gamma)]\} \propto W/\pi \quad (3a)$$

$$A_{T2} \propto 2(W/\pi)\pi_T \quad (3b)$$

$$A_{T3} \propto 3(W/\pi)\pi_T^2 \quad (3c)$$

It is, thus, possible to use multiple units of T1 for the turbines T2 and T3. For example, for a case with π=27 and $\pi_T=3$ we will need six T1 units for T2 and twenty seven T1 units for T3. For low pressure ratio of π=8 and $\pi_T=2$ we will need four T1 units for T2 and twelve T1 units for T3. Thus, we need the same set of rotor and stator blades, as in the baseline cycle but substantially increase the quantity. The total turbine hardware will be thus (34T1 or 14T1) respectively for π=27 and 8. Although these numbers seem to be too large and impracticable, the overall plant complexity and costs need to be carefully worked out before pronouncing final decision. Obviously, mechanical shaft connectivity, between compressors, turbines and load, certainly needs some innovative solutions. Such concepts are considered, for example, in Blended-Wing-Body configuration with distributed propulsion.

Stationary Components

Regenerators: Refer to FIG. 7. All regenerators have identical hot-side flow conditions. On cold-side the mass flow rates and temperatures are also same but the pressures are different as $\pi P_o$, $\pi^{2/3} P_o$ and $\pi^{1/3} P_o$ respectively. Following similar analysis for isentropic compressible flow (as in case of turbines) we can deduce:

$$A_{RG1} \propto W/\pi \quad (4a)$$

$$A_{RG2} \propto W/\pi^{2/3} \quad (4b)$$

$$A_{RG3} \propto W/\pi^{1/3} \quad (4c)$$

First regenerator RG1 will be of baseline size and the other two regenerators RG2 and RG3 can be made of multiple units of RG1. We need innovative packaging solutions for practicality.

Burners/Heaters: Refer to FIG. 7. All Burners/Heaters operate between same temperature limits but differ in mass flow capacities and pressure levels. The first burner B1 operates with mass flow W at pressure $\pi P_o$. It may be noted that each successive burner/heater stage has to handle the cumulative mass flow and the pressure level will reduce by $\pi^{1/3}$. Following the principles of thermodynamics of isentropic compressible flow it can be shown that the burner/heater flow area required for the units B1, B2 and B3 will be:

$$A_{B1} \propto W/\pi \quad (5a)$$

$$A_{B2} \propto 2W/\pi^{2/3} \quad (5b)$$

$$A_{B3} \propto 3W/\pi^{1/3} \quad (5c)$$

Thus, the number of burner/heater units required will be identical to the respective turbine units employed, as in Eq. 3(a) to 3(c).

APPENDIX D

Derivation of Equations

The detailed derivation of the equations, given herein, is appended here for the sake of completeness, especially for the novel cycle schemes. Dry ambient conditions, common to all cycles, are pressure $P_o$ in (kPa) and temperature $T_o$ in (K). Air Mass Flow is $w_{in}$ (kg/s) and properties gas constant R in (kJ/kg/K), specific heat at constant pressure Cp in (kJ/kg/K) and ratio of specific heats $\gamma = C_p/C_v$ are assumed constant. The two more variables, cycle temperature ratio $\theta$ and cycle pressure ratio $\pi$, define all the cycles. $\theta$ is the cycle temperature ratio ($T_{max}/T_{min}$) and $\pi$ is the cycle pressure ratio ($P_{max}/P_{min}$). The cycle pressure ratio $\pi$ is also the overall compression pressure ratio and hence the isentropic compression temperature ratio $\tau$ is equal to $\pi^{\gamma-1/\gamma}$, where $\gamma$ is ratio of specific heats $C_p/C_v$. As seen below, for analytical derivations, '$\tau$' is more convenient variable than '$\pi$', even for 'Isothermal' processes, for which when $\tau_{T=const.}=1$, as [$R \cdot Ln(\pi) = C_p \cdot Ln(\tau)$]. The novel cycles need one more parameter n, which is the number of compression/expansion stages (n=1, 2, 3, etc). The expansion stage pressure ratio is thus $\pi^{1/n}$ and the compression stage pressure ratios will be $\pi^{m/n}$, m reducing from n to 1. 'SI' system of units is used so that (w $C_p T_o$) is in kW.

Figure 2:
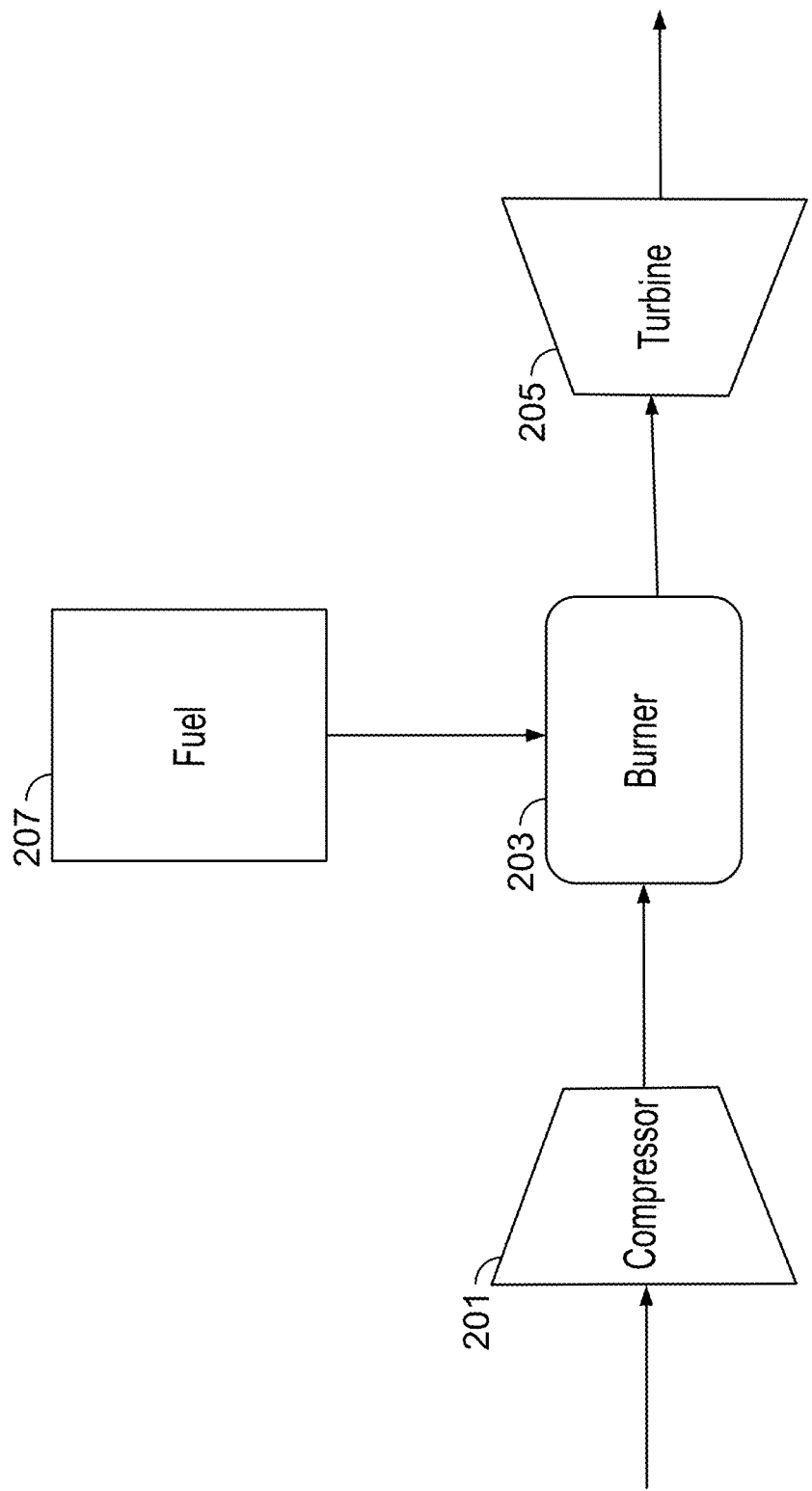
FIG. 2 illustrates the Brayton Open Cycle (Prior Art).

Brayton Open Cycle (BRO)
Refer to FIG. 2. Adiabatic Compressor Power in (kW) is given by $$W_C = w\, C_p T_o(\tau-1) \quad (a1)$$

Adiabatic TurbinePower in (kW) is given by $$W_T = w\, C_p T_o \theta(1-1/\tau) \quad (a2)$$

Cycle Power is given by $$W_{Cy} = W_T - W_C = w C_p T_o[\theta(1-1/\tau)-(\tau-1)] \quad (a3)$$

Specific Power $\bar\omega$ is defined as $W_{Cy}/(C_p T_o)$ or $$\bar\omega_{BRO} = (\theta-\tau)(1-1/\tau) \quad (1a)$$

Heat Input rate in (kW) will be given by $$Q_B = w C_p T_o(\theta-\tau) \quad (a4)$$

and thus Cycle Thermal Efficiency will be given by $$\eta_{BRO} = W_{Cy}/Q_B = (1-1/\tau) \quad (1a)$$

Ericsson Cycle (ERC)
Refer to FIG. 3. Isothermal Compressor Power in (kW) is given in terms of adiabatic compression temperature ratio $\tau = \pi^{\gamma-1/\gamma}$ by $$W_C = w\, R\, T_o\, Ln(\pi) = w\, C_p T_o\, Ln(\tau) \quad (a5)$$

Rate of Heat rejected during compression $Q_C = W_C$
Similarly Isothermal TurbinePower in (kW) is given by $$W_T = w\, C_p T_o \theta\, Ln(\tau) \quad (a6)$$

Rate of Heat supply during expansion will be $Q_T = W_T$
Cycle Power is $$W_{Cy} = W_T - W_C = w C_p T_o\, Ln(\tau)(\theta-1) \quad (a7)$$

Specific Power $\bar\omega = W_{Cy}/(w\, C_p T_o)$ or $$\bar\omega_{ERC} = Ln(\tau)(\theta-1) \quad (1b)$$

Cycle Thermal Efficiency will be $\eta = W_{Cy}/Q_T$ or $$\eta_{ERC} = (1-1/\theta) \quad (1b)$$

Regenerative Open Cycle RGO)
Refer to FIG. 4. Adiabatic Compressor Power in (kW) is given by $$W_C = w\, C_p T_o(\tau-1) \quad (a8)$$

Adiabatic TurbinePower in (kW) is given by $$W_T = w\, C_p T_o \theta(1-1/\tau) \quad (a9)$$

Cycle Power is $$W_{Cy} = W_T - W_C = w C_p T_o[\theta(1-1/\tau)-(\tau-1)]. \quad (a10)$$

Specific Power $\bar\omega = W_{Cy}/(w\, C_p T_o)$ or $$\bar\omega_{RGO} = (\theta-\tau)(1-1/\tau) \quad (1c)$$

Noting that the air is heated in the regenerator up to turbine exit temperature, the Heat Input rate in (kW) will be $$Q_B = w C_p T_o(\theta - \theta/\tau) \quad (a11)$$

Thus the Cycle Thermal Efficiency will be $\eta = W_{Cy}/Q_B$ $$\eta_{RGO} = (\theta-\tau)\theta = (1-\tau/\theta) \quad (1c)$$

Generic Novel Open/Closed n stage Cycles According to Various Embodiments
Refer to FIGS. 5-10. All compression stages handle same air/gas mass flow and operate isothermally. Successive compression stages operate with reduced pressure ratios of $\pi^{m/n}$ with m reducing from n to 1. Thus the stage compression power can be expressed as $$W_{Cm} = w\, R\, T_o\, Ln(\tau^{m/n}) \quad (a12)$$

And the total compression power can be expressed as $$W_{CT} = w\, R\, T_o\, Ln(\pi)\Sigma(m)/n \quad (a13)$$

Further noting that $\Sigma(m) = \frac{1}{2} n(n+1)$, $\tau = \pi^{\gamma-1/\gamma}$ and $\tau = (\tau^{1/n})^n$, We can write the expression for total compression power as $$W_{CT} = \tfrac{1}{2} n(n+1) w C_p T_o\, Ln(\tau^{1/n}) \quad (a14)$$

All turbines operate with same entry temperature $T_o\theta$, same pressure ratio of $(\pi^{1/n})$ or temperature ratio of $(\tau^{1/n})$. Mass flow of each successive stage is cumulative. Thus the total turbine power can be expressed as $$W_{TT} = w C_p T_o \theta\,(1 - 1/\tau^{1/n})\sum(m) \quad (a15)$$
$$= 1/2\, n(n+1) w C_p T_o \theta(1 + 1/\tau^{1/n})$$

Cycle Power will be $$W_{Cy} = W_{TT} - W_{CT} \quad (a16)$$
$$= 1/2\, n(n+1) w C_p T_o[\theta(1 - 1/\tau^{1/n}) - Ln(\tau^{1/n})]$$

Specific Power $\bar\omega = W_{Cy}/(w\, C_p T_o)$ or $$\bar\omega_{NOCn} = \tfrac{1}{2} n(n+1)[\theta(1-1/\tau^{1/n}) - Ln(\tau^{1/n})] \quad (2a)$$

Burners/Heaters operate between same temperature differences of $(T_o\theta - T_o\theta/\tau^{1/n})$ but their air and fuel mass flow rates are cumulative. Total rate of heat added for both types will be similarly equal to $$Q_{BT} = \tfrac{1}{2} n(n+1) w C_p T_o \theta(1-1/\tau^{1/n}) \quad (a17)$$

The cycle thermal efficiency will be $\eta = (W_{Cy}/Q_{BT})$ or $$\eta_{NOCn} = \{1 - Ln(\tau^{1/n})/[\theta(1-1/\tau^{1/n})]\} \quad (2c)$$

Sum of n Equivalent Ericsson Cycles
n stage Novel Generic Cycle is considered equivalent to n Ericsson cycles together. Each operating with same cycle temperature ratio $\theta$ but pressure ratio of $\pi^{m/n}$, m reducing from n to 1.
Since $\Sigma(m/n) = \frac{1}{2}(n+1)$ the total compression, expansion and cycle power of n cycles will be:

$$W_{CE} = \tfrac{1}{2}(n+1) w C_p T_o\, Ln(\tau) \quad (a18)$$

$$W_{TE} = \tfrac{1}{2}(n+1) w C_p T_o\, Ln(\tau) \quad (a19)$$

$$W_{CY} = \tfrac{1}{2}(n+1) w C_p T_o(\theta-1) Ln(\tau) \quad (a20)$$

$$\bar\omega_{ERCn} = \tfrac{1}{2} \cdot (n+1) \cdot (\theta-1) \cdot Ln(\tau) \quad (2b)$$

$$\eta_{ERCn} - 1 - 1/\theta \quad (2d)$$

n=1, 2, 3, . . . .

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A power generation method, comprising:
providing a plurality of functional units, wherein each of the plurality of functional units comprises a compressor, a regenerator, a combustion unit and a turbine, wherein the number of the plurality of functional units is equal to n, and wherein n is an integer greater than 1;
directing, for each of the functional units, compressed gas from the compressor to the regenerator, wherein the compressor utilizes a coolant;
directing, for each of the functional units, heated gas from the regenerator to the combustion unit;
directing, for each of the functional units, exhaust gas from the combustion unit to the turbine;
directing, for each of the functional units other than the nth functional unit, expanded gas from the turbine to the combustion unit of a successive functional unit to provide to the combustion unit of the successive functional unit expanded gas from the turbine; and
directing, for the nth functional unit, expanded gas from the turbine to the regenerator of each preceding functional unit, in parallel, to provide to the regenerator of each preceding functional unit expanded gas from the turbine of the nth functional unit, wherein the expanded gas from the turbine of the nth functional unit is split into n portions, each regenerator of the plurality of functional units being provided with one portion of the n portions of the expanded gas from the turbine of the nth functional unit.

2. The power generation method of claim 1, wherein each combustion unit utilizes fuel from a fuel supply to perform combustion.

3. The power generation method of claim 2, further comprising a fuel storage containing the fuel supply, the fuel storage being in operative communication with each of the combustion units.

4. The power generation method of claim 2, wherein the fuel supply is selected from the group: (a) natural gas; (b) methane; (c) kerosene; (d) diesel fuel; (e) gasoline; (f) coal; (g) combustible oil; (h) combustible wood; (i) any combustible material; (j) a liquid hydrocarbon; (k) a gaseous hydrocarbon; (l) hydrogen; (m) jet fuel; and (n) any combination thereof.

5. The power generation method of claim 1, wherein, in each functional unit, the regenerator is configured to receive the coolant from the compressor.

6. The power generation method of claim 5, wherein, in each functional unit, the compressor is configured to receive back recovered coolant from the regenerator.

7. The power generation method of claim 1, wherein, in each functional unit, the coolant is independently selected from the group: (a) water; (b) methanol; (c) ethanol; and (d) any combination thereof.

8. The power generation method of claim 1, wherein the plurality of functional units comprises a first functional unit and a second functional unit, and the second functional unit is the successive functional unit of the first functional unit;
wherein the first functional unit comprises a first compressor, a first regenerator, a first combustion unit and a first turbine, and the second functional unit comprises a second compressor, a second regenerator, a second combustion unit and a second turbine; and
the first compressor and the second compressors are multistage compressors and the first compressor has more stages than the second compressor.

\* \* \* \* \*